(12) United States Patent
Belleschi et al.

(10) Patent No.: US 11,297,526 B2
(45) Date of Patent: Apr. 5, 2022

(54) WIRELESS DEVICE, RADIO NETWORK NODE AND METHODS PERFORMED THEREIN

(71) Applicant: Telefonaktiebolaget LM Ericsson (publ), Stockholm (SE)

(72) Inventors: Marco Belleschi, Solna (SE); Mattias Bergström, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/961,965

(22) PCT Filed: Feb. 14, 2019

(86) PCT No.: PCT/SE2019/050129
§ 371 (c)(1),
(2) Date: Jul. 14, 2020

(87) PCT Pub. No.: WO2019/160489
PCT Pub. Date: Aug. 22, 2019

(65) Prior Publication Data
US 2020/0367093 A1    Nov. 19, 2020

Related U.S. Application Data

(60) Provisional application No. 62/630,870, filed on Feb. 15, 2018.

(51) Int. Cl.
*H04W 28/02* (2009.01)
*H04W 72/08* (2009.01)

(52) U.S. Cl.
CPC ... *H04W 28/0268* (2013.01); *H04W 28/0278* (2013.01); *H04W 72/087* (2013.01)

(58) Field of Classification Search
CPC ......... H04W 28/0263; H04W 28/0268; H04W 28/0278; H04W 72/0413; H04W 72/087; H04W 72/10; H04W 76/14
See application file for complete search history.

(56) References Cited

U.S. PATENT DOCUMENTS

2019/0124669 A1    4/2019 Luo et al.
2019/0182789 A1*   6/2019 Kim .................... H04W 76/14

FOREIGN PATENT DOCUMENTS

| EP | 3273634 A1 | 1/2018 |
|----|------------|--------|
| RU | 2643349 C1 | 2/2018 |
| WO | 2017051330 A1 | 3/2017 |
| WO | 2017111316 A1 | 6/2017 |

(Continued)

*Primary Examiner* — Khoa Huynh
(74) *Attorney, Agent, or Firm* — Murphy, Bilak & Homiller, PLLC

(57) ABSTRACT

Embodiments herein relate to method performed by a radio network node (12) for handling communication between wireless devices over a sidelink in a wireless communication network. The radio network node configures a wireless device by indicating a set of one or more quality of service, QoS, requirements, wherein each QoS requirement comprises a threshold associated with a QoS characteristic, and by indicating a mapping of one or more logical channel groups, LCG, reserved for buffer status report, BSR, reporting of a sidelink for data fulfilling respective QoS requirement out of the set of one or more QoS requirements.

20 Claims, 15 Drawing Sheets

(56) References Cited

FOREIGN PATENT DOCUMENTS

| WO | 2017133592 A1 | 8/2017 |
|----|---------------|--------|
| WO | 2017158515 A1 | 9/2017 |
| WO | 2019108123 A1 | 6/2019 |

\* cited by examiner

| | Oct 1 | Oct 2 | Oct 3 | Oct 3 |
|---|---|---|---|---|
| | Destination index$_1$ | LCG ID$_1$ | Buffer Size$_1$ | |
| | Buffer Size$_1$ | Destination index$_2$ | | |
| | | | Buffer Size$_2$ | |
| | LCG ID$_2$ | | | |
| | R | R | R | R | R | R | G | G |

FIG. 5

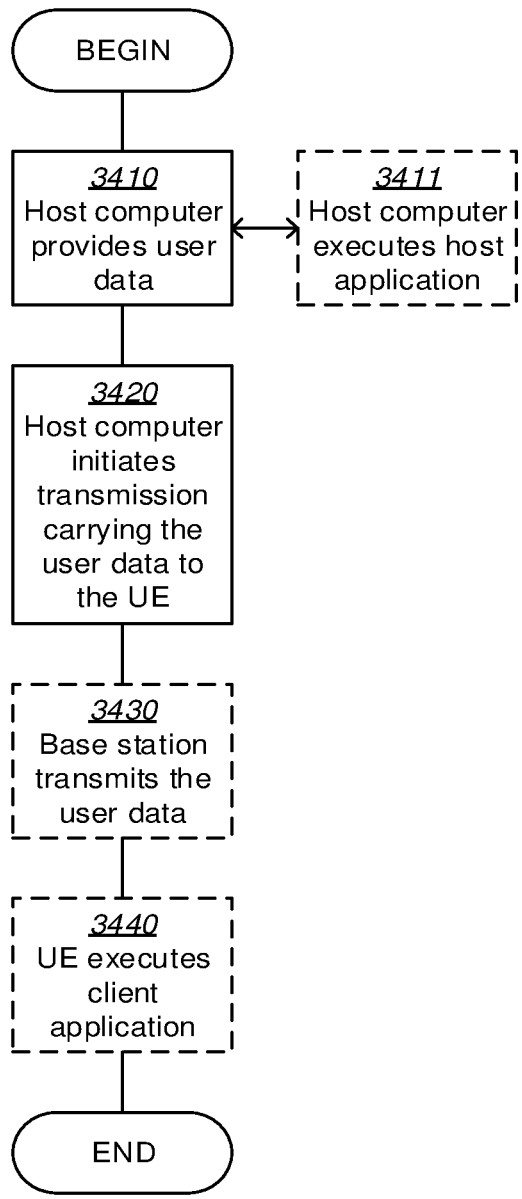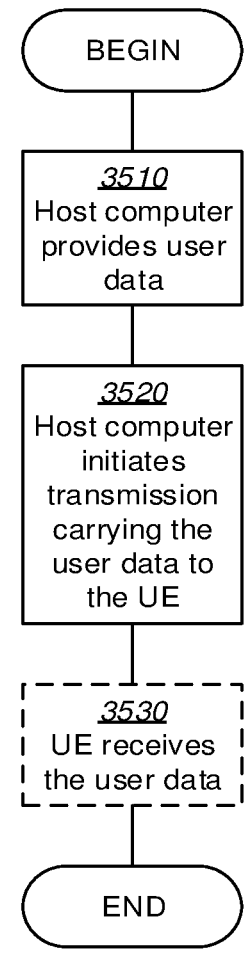
FIG. 12
FIG. 13

WIRELESS DEVICE, RADIO NETWORK NODE AND METHODS PERFORMED THEREIN

TECHNICAL FIELD

Embodiments herein relate to a wireless device, a radio network node and methods performed therein regarding wireless communication. In particular, embodiments herein relate to handling communication of the wireless device in a wireless communication network.

BACKGROUND

In a typical wireless communication network, wireless devices, also known as wireless communication devices, mobile stations, stations (STA) and/or user equipments (UE), may communicate via a Radio Access Network (RAN) to one or more core networks (CN). The RAN covers a geographical area which is divided into service areas, also known as cells, with each cell area being served by a radio network node e.g., a Wi-Fi access point or a radio base station (RBS), which in some networks may also be called, for example, a NodeB, an eNodeB or a gNodeB. The cell is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for e.g. third generation networks, and investigate enhanced data rate and radio capacity and upcoming generation networks. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

With the emerging 5G technologies such as New Radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver may amplify signals from a selected direction or directions, while suppressing unwanted signals from other directions.

The 3GPP standard for telecommunications is continuously developing into different versions or releases. During Rel. 12, the LTE standard was extended with a support of device to device (D2D) features, also referred to as sidelink features, targeting both commercial and Public Safety applications. Some applications enabled by Rel. 12 LTE are device discovery, where wireless devices are able to sense the proximity of another wireless device and an associated application by broadcasting and detecting discovery messages that carry wireless device identities and application identities. Another application consists of direct communication based on physical channels terminated directly between wireless devices. In 3GPP, all of these applications are defined under an umbrella named Proximity Services (ProSe).

One of the potential extensions of the ProSe framework consists of support of Vehicle to Anything (V2x) communication, which includes any combination of direct communication between vehicles, pedestrians, and infrastructure. V2x communication may take advantage of a network (NW) infrastructure, when available, but at least basic V2x connectivity should be possible even in case of lack of coverage. Providing an LTE-based V2x interface may be economically advantageous because of the LTE economies of scale and it may enable tighter integration between communications with the NW infrastructure, denoted as vehicle to infrastructure (V2I), and vehicle to pedestrians (V2P) and vehicle to vehicle (V2V) communications, as compared to using a dedicated V2x technology.

There are many research projects and field tests of connected vehicles in various countries or regions, including projects that are based on the use of existing cellular infrastructure.

V2x communications may carry both non-safety and safety information, where each of the applications and services may be associated with specific requirements sets, e.g., in terms of latency, reliability, capacity, etc. From the application point of view, V2x includes the following types of communication/services, see FIG. 1.

V2V: Covers communication between vehicles using V2V applications and is predominantly broadcast-based. V2V may be realized by either direct communication between the devices in the respective vehicles, or via infrastructure such as a cellular network. An example of V2V is the transmission of a cooperative awareness message (CAM) with vehicle status information, such as position, direction, and speed, transmitted to other vehicles in the proximity repeatedly e.g. every 100 ms-1 s. Another example is the transmission of a decentralized environmental notification message (DENM), which is an event-triggered message to alert vehicles. These two examples are taken from the ETSI Intelligent Transport Systems (ITS) specification of V2x applications, which also specifies the conditions under which the messages are generated. Main characteristic of V2V applications is the tight requirements on latency that can vary from 20 ms, e.g. for pre-crash warning messages, to 100 ms for other road safety services.

V2I: This comprises communication between vehicles and a Roadside Unit (RSU). The RSU is a stationary transportation infrastructure entity which communicates with vehicles in its proximity. An example of V2I is a transmission of speed notifications from the RSU to vehicles, as well as queue information, collision risk alerts, curve speed warnings. Due to the safety related nature of V2I, delay requirements are similar to V2V requirements.

V2P: Covers communication between vehicles and vulnerable road users, such as pedestrians, using V2P applications. V2P typically takes place between distinct vehicles and pedestrians either directly or via infrastructure such as cellular network.

Vehicle to network (V2N): Covers communication between a vehicle and a centralized application server, or an Intelligent Transportation System (ITS) Traffic Management Center, both using V2N applications, via infrastructure, such as a cellular network. One example is a bad road condition warning sent to all vehicles in a wide area, or traffic flow optimization in which V2N application suggests speeds to vehicles and coordinates traffic lights. Therefore, V2N messages are supposed to be controlled by a centralized entity, i.e. the Traffic Management Center, and provisioned to vehicles in a large geographical area, rather than in a small area. Additionally, unlike V2V or V2I, latency requirements are more relaxed in V2N because it is not meant to be used for non-safety purposes, e.g. 1 s latency requirement is typically considered.

As previously mentioned sidelink transmissions, also known as D2D transmissions or ProSe transmissions, over a radio interface called PC5 interface in cellular spectrum have been standardized in 3GPP since release Rel. 12. In 3GPP Rel. 12 two different transmission modes have been specified in 3GPP. In one mode, called mode-1, a wireless device in an RRC_CONNECTED mode requests D2D resources and the radio network node grants the resources via a Physical Downlink Control Channel (PDCCH) e.g. sending DL control information such as DCI5, or via a dedicated signalling. In another mode called mode-2, a wireless device autonomously selects resources for transmission from a pool of available resources that the radio network node provides in a broadcast via a system information block (SIB) signalling for transmissions on carriers other than a Primary Cell (PCell) or via a dedicated signalling for transmission on the PCell. Therefore, unlike the first operation mode, i.e. mode-1, the second operation mode, i.e. mode-2, can be performed also by wireless devices in an RRC_IDLE mode and in some cases even by wireless devices out of coverage.

In Rel. 14, the usage of sidelink transmissions is extended to the V2x domain. The original design of the sidelink physical layer in Rel. 12 targeted a scenario with a small number of wireless devices competing for the same physical resources in the spectrum, to carry voice packet for mission critical push to talk (MCPTT) traffic, and assumed low wireless device mobility. On the other hand, in V2x the sidelink should be able to cope with higher load scenario, i.e. hundreds of cars potentially contending for physical resources, to carry time or event triggered V2x messages such as CAM and DENM, and with high wireless device mobility. For such reasons, 3GPP has discussed possible enhancements to the sidelink physical layer.

A first enhancement that has been specified in Rel. 14 is the introduction of a new transmission mode, called mode-3, which resembles mode-1 in the sense that it is the radio network node that explicitly assigns sidelink resources to the wireless device. However, unlike mode-1, the radio network node has the possibility to configure the sidelink resources semi-persistently in a Semi Persistent scheduling (SPS)-like fashion, i.e. the radio network node assigns a sidelink grant for periodic transmissions on e.g. a certain frequency resource.

A second enhancement is the introduction of the so-called channel sensing and sensing-aware wireless device autonomous resource allocation, which corresponds to a fourth mode called mode-4 transmission mode. Unlike random resource selection which is the base for Rel. 12 and Rel. 13 ProSe communications, in V2V Rel. 14) wireless devices are expected to continuously sense the channel and search for resources in the different part of the spectrum that are less interfered. Such sensing has the objective to limit collisions between wireless devices.

Two types of sensing have been considered in 3GPP:

Sensing based on received power. A wireless device measures the received energy on specific radio resources:

For example, based on these measurements, the wireless device decides whether the radio resources are considered to be in use by some other wireless device, i.e., 'busy', or not, i.e., 'idle'.

For example, the wireless device may use the measurements to estimate whether the transmitter is far away, e.g., if the signal is weak, or nearby, e.g., if the signal is strong.

Sensing based on packet contents. A wireless device receives a packet and decodes it. Based on the information extracted from the packet, the wireless device may obtain some knowledge about the utilization of radio resources:

For example, by reading a scheduling assignment (SA) packet a wireless device may know in which radio resources to expect data transmissions, and the priority level of the transmitter.

For example, by reading a data packet a wireless device may know the position of the transmitter, the identity (ID) of transmitter, the type of transmitter, etc.

Although in mode-4 the wireless device autonomously selects the transmission resources on the basis of the sensing results, it is still possible for the radio network node to signal some sets of the values that the wireless device is allowed to use for certain transmission parameters. For example, for the number of physical resource blocks (PRB) used by a wireless device for a transmission the radio network node may specify a minimum and maximum value, i.e., the wireless device is not allowed to use less than X PRBs or more than Y PRBs for the transmission; whether the wireless device is allowed to transmit or not; the maximum and minimum modulation and coding scheme (MCS) the wireless device can use, the minimum and/or maximum transmission power; etc. In other words, the radio network node can restrict the set of values that the wireless device can select for certain transmission parameters. Such sets or restrictions on the transmission parameters may be configured differently by the network for different wireless device conditions e.g. depending on the wireless device speed or channel congestion status. In addition to configuration by the radio network node, or a NW node in general, the sets or restrictions may also be part of a pre-configuration. Pre-configuration may be used as an alternative or as a complement to configuration by the radio network node.

In regards to sidelink quality of service (QoS), it should be noted that each packet to be transmitted over the PC5 interface is marked by an application layer to a specific packet tag, called ProSe per packet priority (PPPP). Each PPPP represents a priority assigned by the application layer to a given sidelink packet. In particular, each PPPP may assume values from 1 to 8, where 1 represents the highest priority PPPP and 8 the lowest priority.

Depending on the PPPP assigned by application layers, different RAN procedures are applied. For example, for different PPPPs, different transmission parameters, e.g. MCS, transmitting power, number of PRBs, etc., may be applied by the wireless device, according to a network configuration. The PPPP may also be used to determine whether a certain pool, or a certain carrier may be used depending on an interference or a congestion situation experienced in that pool. In this way, a sort of admission control procedure based on the PPPP may be performed, so that, for example, higher-priority PPPP should be transmitted in lowest congested carriers or pool to increase the probability of correct reception.

In the medium access control (MAC) layer, the PPPP are mapped to the logical channel identities (LCID) by the wireless device for logical channel prioritization when building a MAC protocol data unit (PDU). The PPPP are also mapped to different logical channel groups (LCG), according to network configuration, and used in a sidelink (SL) buffer status report (BSR), so that the radio network node can provide proper sidelink grant when scheduling the wireless device.

SUMMARY

It should be noted that the radio interface framework such as interface Uu quality of service (QoS) framework associates to each quality class index (QCI), different performance requirements such as data rate e.g. Guarantee bit rate (GBR) or non-GBR, packet delay budget, reliability i.e. the packet error rate (PER). However, unlike the Uu QoS framework, at the moment up to Rel.14, no performance requirement, other than the PPPP, is associated to a sidelink packet. Thus, in current sidelink framework, there is no sidelink performance indicator, other than the PPPP. This may limit the ability of the existing scheduling allocation procedures, e.g. for both mode-3 and mode-4, to properly serve a given wireless device. In fact, the PPPP exclusively indicates the priority in which a given packet should be served by radio network node scheduler, for radio network node-scheduler random access (RA), or by the wireless device, for wireless device autonomous RA. However, in some cases, it might be useful to know the reliability requirement of a given SL packet, so that specific actions could be performed, e.g. it may be configured SL packet duplication over different SL carriers to increase correct reception probability, or more conservative encoding could be adopted if reliability requirements are strict. Similarly, if high data rates are required, a higher number of carriers may be used, or more aggressive encoding and larger bandwidth may be allocated.

Therefore, in the legacy sidelink framework, the wireless device just reports to the network in the SL BSR the LCGs associated to the PPPPs of the packets which are in the wireless device SL buffer at the moment. As such, the network may only be aware of the PPPP of the packet in the SL buffer, and no indication of the reliability, data rate, or other performance requirement can be retrieved. Additionally, there is no signaling from the radio network node that enables a wireless device to enable packet duplication.

An object herein is to provide a mechanism to in an efficient manner enable device to device communication in a wireless communication network.

According to an aspect the object is achieved, according to embodiments herein, by providing a method performed by a radio network node for handling communication between wireless devices over a sidelink in a wireless communication network. The radio network node indicates a set of one or more quality of service (QoS) requirements, wherein each QoS requirement comprises a threshold associated with a QoS characteristic, and by indicating a mapping of one or more logical channel groups (LCGs) reserved for buffer status report (BSR) reporting of a sidelink for data fulfilling respective QoS requirement out of the set of one or more QoS requirements. The radio network node may thus configure the wireless device by indicating a set of one or more QoS. For each of such QoS of interest, the radio network node may reserve one or more LCGs for BSR reporting of the sidelink. The radio network node may then receive an indication from a wireless device in a buffer status report, which indication indicates a QoS requirement or characteristic of a packet. The indication being associated with a logical channel. The radio network node may then handle the communication of the sidelink of the wireless device taking the received indication into account.

According to another aspect the object is achieved, according to embodiments herein, by providing a method performed by a wireless device for handling communication between wireless devices over a sidelink in a wireless communication network. The wireless device configures e.g. from pre-configuration or reception, a set of one or more QoS requirements, wherein each QoS requirement comprises a threshold associated with a QoS characteristic, and a mapping of one or more LCGs reserved for BSR reporting, to a radio network node, of a sidelink for data fulfilling respective QoS requirement out of the set of one or more QoS requirements. Thus, the wireless device is configured with a set of one or more QoS wherein for each of such QoS one or more LCGs are reserved for BSR reporting for a sidelink. The wireless device may transmit an indication to the radio network node in a buffer status report, which indication indicates a QoS requirement or characteristic of a packet. The indication being associated with a logical channel.

It is furthermore provided herein a computer program product comprising instructions, which, when executed on at least one processor, cause the at least one processor to carry out any of the methods above, as performed by the radio network node or the wireless device. It is additionally provided herein a computer-readable storage medium, having stored thereon a computer program product comprising instructions which, when executed on at least one processor, cause the at least one processor to carry out the method according to any of the methods above, as performed by the radio network node or the wireless device.

According to yet another aspect the object is achieved, according to embodiments herein, by providing a radio network node for handling communication between wireless devices over a sidelink in a wireless communication network, wherein the radio network node is configured to configure a wireless device by indicating a set of one or more QoS requirements, wherein each QoS requirement comprises a threshold associated with a QoS characteristic, and by indicating a mapping of one or more LCG reserved for BSR reporting of a sidelink for data fulfilling respective QoS requirement out of the set of one or more QoS requirements.

According to still another aspect the object is achieved, according to embodiments herein, by providing a wireless device for handling communication between wireless devices over a sidelink in a wireless communication network. The wireless device is adapted to configure, from pre-configuration or reception, a set of one or more QoS requirements, wherein each QoS requirement comprises a threshold associated with a QoS characteristic, and a mapping of one or more LCGs reserved for BSR reporting, to a radio network node, of a sidelink for data fulfilling respective QoS requirement out of the set of one or more QoS requirements.

Embodiments herein provide methods allowing the wireless device to report to the radio network node a plurality of indications e.g. sidelink QoS indicators, such as data rate, reliability, latency, etc.

The radio network node may have tools to retrieve some SL QoS indicators, other than just the PPPP, so that proper scheduling decisions can be taken, e.g. the radio network node may activate sidelink packet duplication if the wireless device has packets in the SL buffer which require high reliability delivery, or it may activate one or more carriers depending on the data rate of the packet to transmit. Decisions on the actual transmitting parameters, e.g. MCS, TX power, number of PRBs, etc., to be adopted by the wireless device may also be affected. Embodiments herein thus enable a device to device communication in a wireless communication network in an efficient manner.

BRIEF DESCRIPTION OF THE DRAWINGS

Embodiments will now be described in more detail in relation to the enclosed drawings, in which:

FIG. 5 shows group reporting in MAC CE;

FIG. 12 shows methods implemented in a communication system including a host computer, a base station and a user equipment in accordance with some embodiments;

FIG. 13 shows methods implemented in a communication system including a host computer, a base station and a user equipment in accordance with some embodiments;

DETAILED DESCRIPTION

Figure 1:
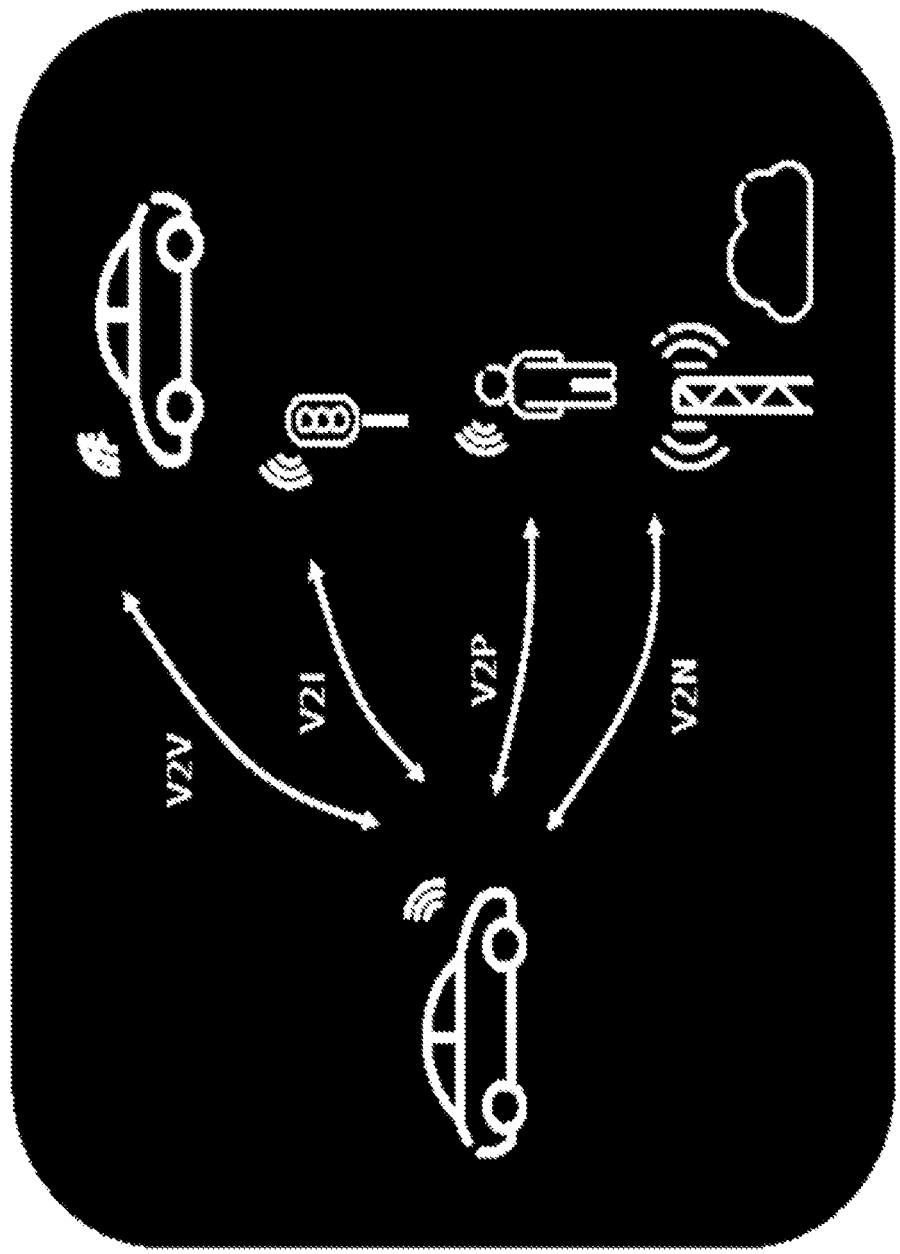
FIG. 1 is an overview depicting different vehicle communications.
Figure 2:
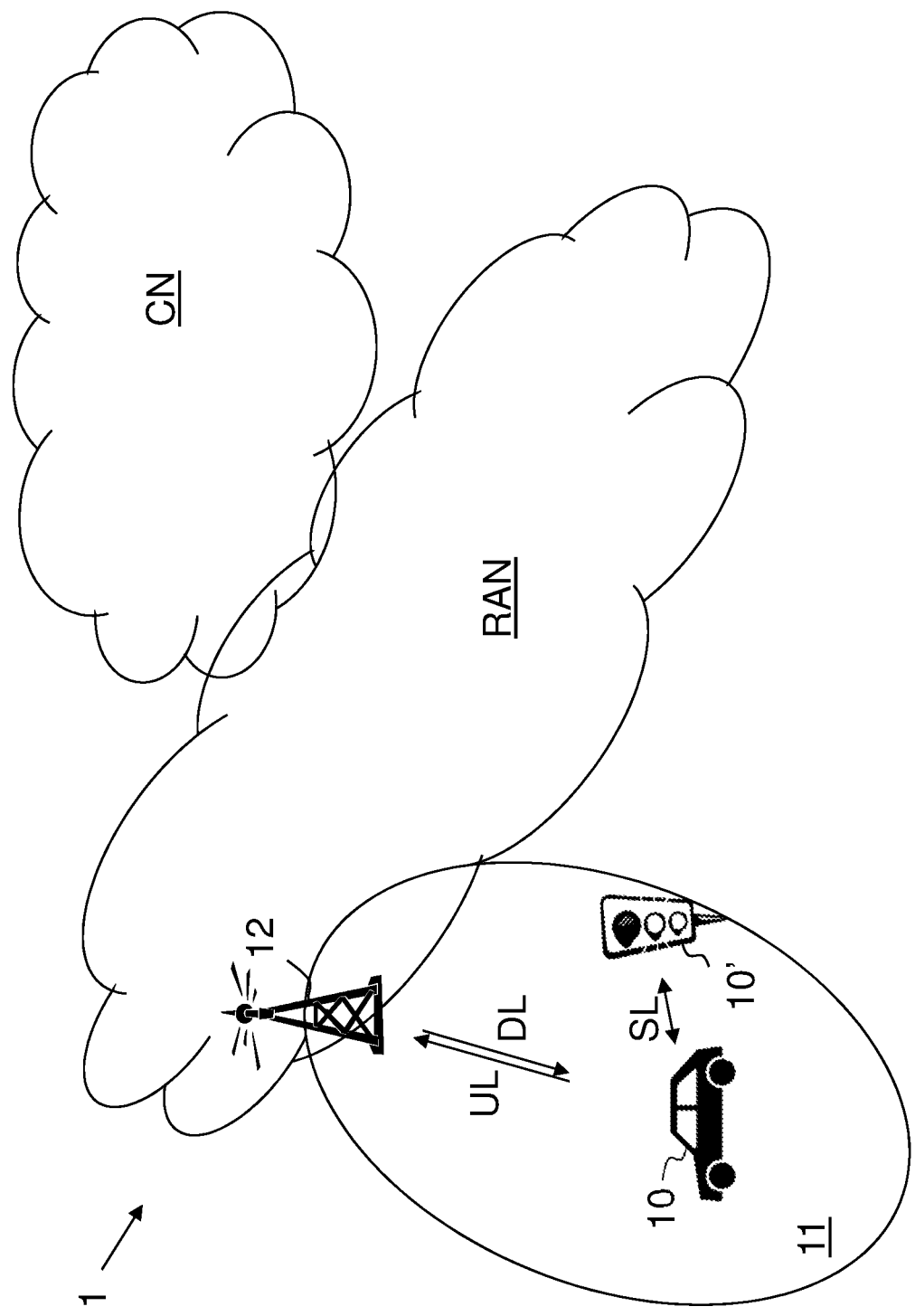
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies. Embodiments herein relate to recent technology trends that are of particular interest in a 5G context, however, embodiments are also applicable in further development of existing wireless communication systems such as e.g. LTE and Wideband Code Division Multiple Access (WCDMA).

In the wireless communication network 1, wireless devices configured to communicate with one another over a sidelink e.g. a wireless device 10 and another or second wireless device 10', such as a Device to device terminal in a vehicle e.g. a mobile station, a non-access point (non-AP) STA, a STA, a user equipment and/or a wireless terminal, may be configured for communication from a NW for e,g, V2x communication. It should be understood by the skilled in the art that "wireless device" is a non-limiting term which means any terminal, wireless communication terminal, user equipment, NB-IoT device, Machine Type Communication (MTC) device, Device to Device (D2D) terminal, or node e.g. smart phone, laptop, mobile phone, sensor, relay, mobile tablets or even a small base station capable of communicating using radio communication with a radio network node or a wireless device. Embodiments herein may relate to vehicle to anything communication wherein the first wireless device 10 may be a vehicle and the second wireless device 10' may be a stop sign (V2I), a radio network node (V2N), a device on a pedestrian (V2P), or another vehicle (V2V) or vice versa.

The wireless communication network 1 comprises a radio network node 12 providing radio coverage over a geographical area, a service area 11, of a first radio access technology (RAT), such as NR or similar. The radio network node 12 configures the sidelink for the wireless devices. The radio network node 12 may be a transmission and reception point such as an access node, an access controller, a base station, e.g. a radio base station such as a gNodeB (gNB), an evolved Node B (eNB, eNode B), a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node 12 depending e.g. on the first radio access technology and terminology used. As an alternative, the radio network node 12 may be a Distributed Node DN and functionality, e.g. comprised in a cloud may be used for performing or partly performing the methods herein. The radio network node 12 may be referred to as a serving radio network node wherein the service area may be referred to as a serving cell, and the serving network node communicates with the wireless device 10 in form of DL transmissions to the wireless device 10 and UL transmissions from the wireless device 10. It should be noted that a service area may be denoted as cell, beam, beam group or similar to define an area of radio coverage.

In the following we mainly focus on certain QoS performance requirements or characteristics such as, e.g. data rate, reliability, latency, to which a certain sidelink packet may be associated to. However embodiments herein may easily be generalized to other QoS requirements also referred to as QoS indicators. According to embodiments herein the radio network node 12 configures the wireless device 10 by indicating a set of one or more QoS requirements, wherein each QoS requirement comprises a threshold associated with a QoS characteristic, and by indicating a mapping of one or more LCGs reserved for BSR reporting of a sidelink for data fulfilling respective QoS requirement out of the set of one or more QoS requirements. The methods according to embodiments herein are performed by the wireless device 10 and the radio network node 12.

Figure 3A:
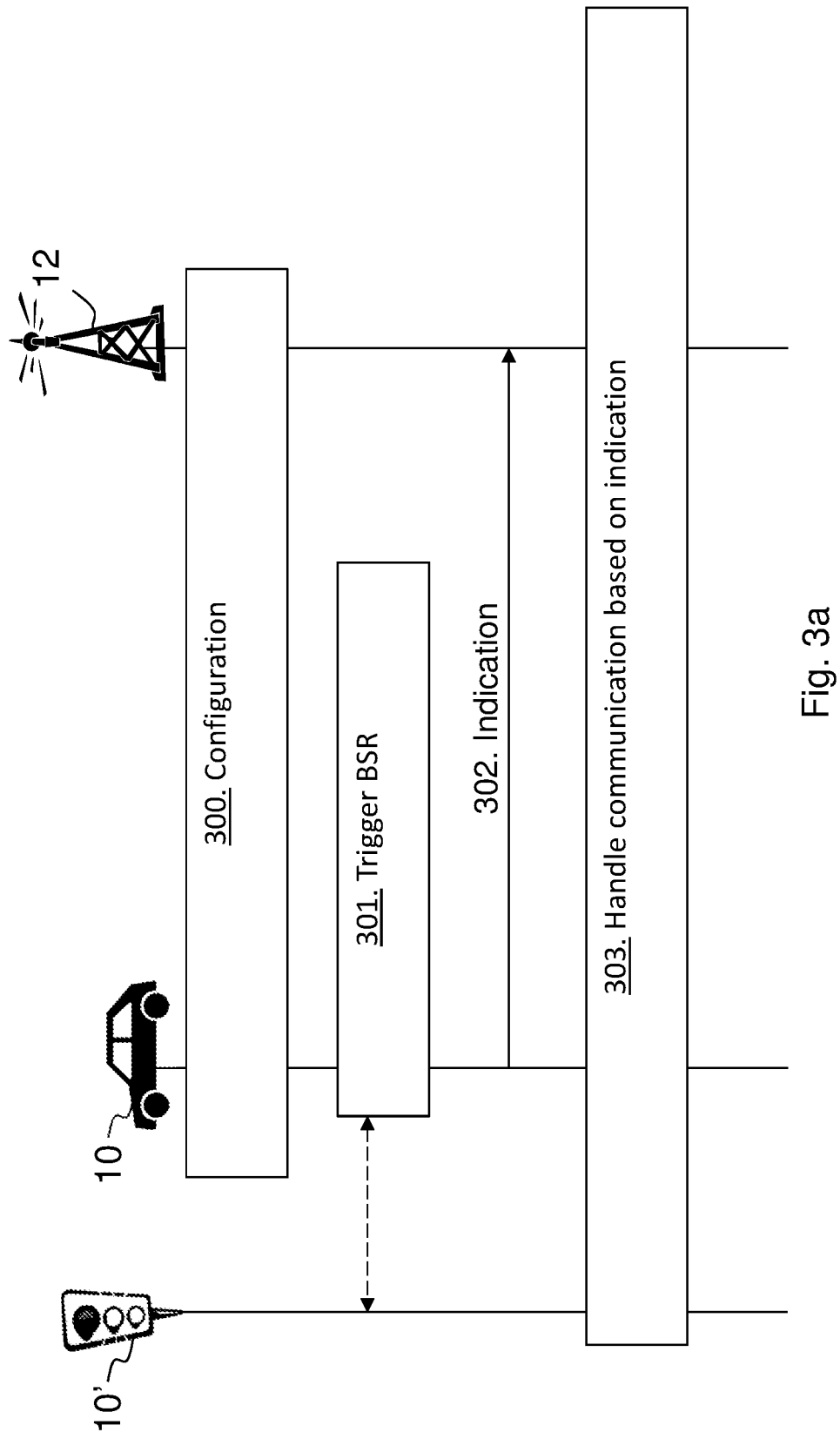
FIG. 3a shows a combined flowchart and signalling scheme according to embodiments herein.

FIG. 3a is a combined flowchart and signaling scheme according to embodiments herein.

Action 300. The radio network node 12 or pre-configuration of the wireless device 10 may indicate a set of one or more QoS requirements. All the possible QoS requirements that are specified may be of interest. For each of such QoS requirement of interest, the radio network node 12 or pre-configuration of the wireless device 10 may reserve one or more LCGs for BSR reporting for data fulfilling respective QoS requirement. For example, the radio network node 12 may, transmit an indication to the wireless device 10, i.e. indicate the wireless device 10 to use a certain LCG for reporting the buffer status of data having a certain QoS requirement fulfilled and a to use a second LCG for reporting buffer status of data having another QoS requirement fulfilled.

Considering that a given packet may have multiple QoS characteristics of interest, the wireless device 10 may map such packet into multiple LCGs, where each LCG corresponds to one QoS characteristic of such packet. Since such packet is anyhow mapped by the wireless device 10 into one single LCID for logical channel prioritization, the wireless device 10 may map such single LCID into multiple LCGs following the procedure aforementioned. This method implies that the wireless device 10 may keep an independent buffer status for each LCG, i.e. for each QoS requirement, to determine the amount of data available in the buffer with a certain QoS requirement.

Alternatively or additionally, depending on the radio network node 12 or pre-configuration of the wireless device 10, one or more QoS requirements may be prioritized over others. For example, the radio network node 12 may indicate that a first QoS requirement, e.g. reliability such as PPPR of a first level, is prioritized, regardless of other QoS requirements of such packet. In such case, the wireless device 10 may map such packet fulfilling the QoS requirement only to a single LCG, i.e. the LCG reserved by (pre)configuration to report data fulfilling that QoS requirement such as a set reliability value.

Alternatively or additionally, one specific QoS requirement may be prioritized, only if the corresponding QoS value is above a threshold, which may be (pre)configured. For example, if the PPPR of a packet is below (or above depending on whether a high priority is having a low or high value) a PPPR threshold, meaning that the PPPR of the packet is not relevant, the wireless device 10 may ignore the PPPR of the packet, at least for the purpose of LCG mapping, and may not update any buffer status of any LCG that is associated to a particular value of PPPR. All packets may be mapped to at least one LCG. Embodiments herein allow that a packet is mapped to a LCG based on the QoS of that packet, and e.g a LCG may be for e.g. packets with PPPR>4. But a packet may have multiple QoS requirements associated to it, e.g. a value for PPPR (R for reliability) and a value for PPPP (P for priority) so it is herein allowed that the packet is mapped to a special LCG if the Reliability is high, but the same packet may also be mapped to another LCG, e.g. a LCG for Priority >2. Otherwise, the wireless device 10 may update the buffer status of the LCG(s) associated to the PPPR by considering the packet. Note, 'buffer status' also covers for example a size of the buffer.

The aforementioned threshold or thresholds may be (pre) configured differently for different SL services, and/or for different destination identities (ID). In this way, considering that the wireless device 10 has to transmit a packet corresponding to a specific service or to a specific destination, the wireless device 10 may update the buffer status of that specific destination and/or service only if the QoS requirement of this packet is relevant for its related packet destination and/or service.

Action 301. The wireless device 10 may trigger a BSR of packets between the wireless device 10 and another wireless device such as the second wireless device 10' e.g. a level of the buffer for packets of PPPR is reached.

Action 302. The wireless device 10 may then further transmit an indication indicating a QoS requirement, also referred to as QoS characteristic(s) associated with the sidelink. The indication is associated with a logical channel e.g. a logical channel ID (LCID) or a logical channel group (LCG), e.g. the indication may be the LCID or the LCG. The indication may be comprised in the BSR to the radio network node 12.

In one method, the radio network node 12 may provide for certain QoS requirements a mapping between such QoS requirement and a certain LCG. Since there might be multiple QoS requirements, each of such QoS requirements may be map to a different LCG set. An LCG set includes all the LCGs, e.g. up to 4, associated to a specific QoS requirement.

Such configuration indication may be provided in dedicated signalling or broadcast signalling. Once the wireless device has received the configuration indication, the wireless device 10 determines one or more performance characteristics of a packet in a buffer and associates each individual performance characteristic to one of the LCG in the LCG set configured for this specific performance characteristic.

The LCGs of one, or more, LCG sets may then be reported in the SL BSR to the radio network node 12. Thus the wireless device 10 may transmit the indication being an LCG to the radio network node 12.

Different methods can be envisaged for the design of the SL BSR reported in the MAC control element (CE), depending on how the different sets of LCGs are represented.

Action 303. The radio network node 12 may then handle the communication of the wireless device 10 taking the received indication into account, e.g. the radio network node may activate sidelink packet duplication if the wireless device has packets in the SL buffer which require high reliability delivery, or it may activate one or more carriers depending on the data rate of the packet to transmit. Decisions on the actual transmitting parameters, e.g. MCS, Transmission (Tx) power and number of PRBs, to be adopted by the wireless device 10 may also be affected. E.g. the radio network node 12 may configure packet duplication for all packets having reliability requirement of a certain relevance.

Figure 3B:
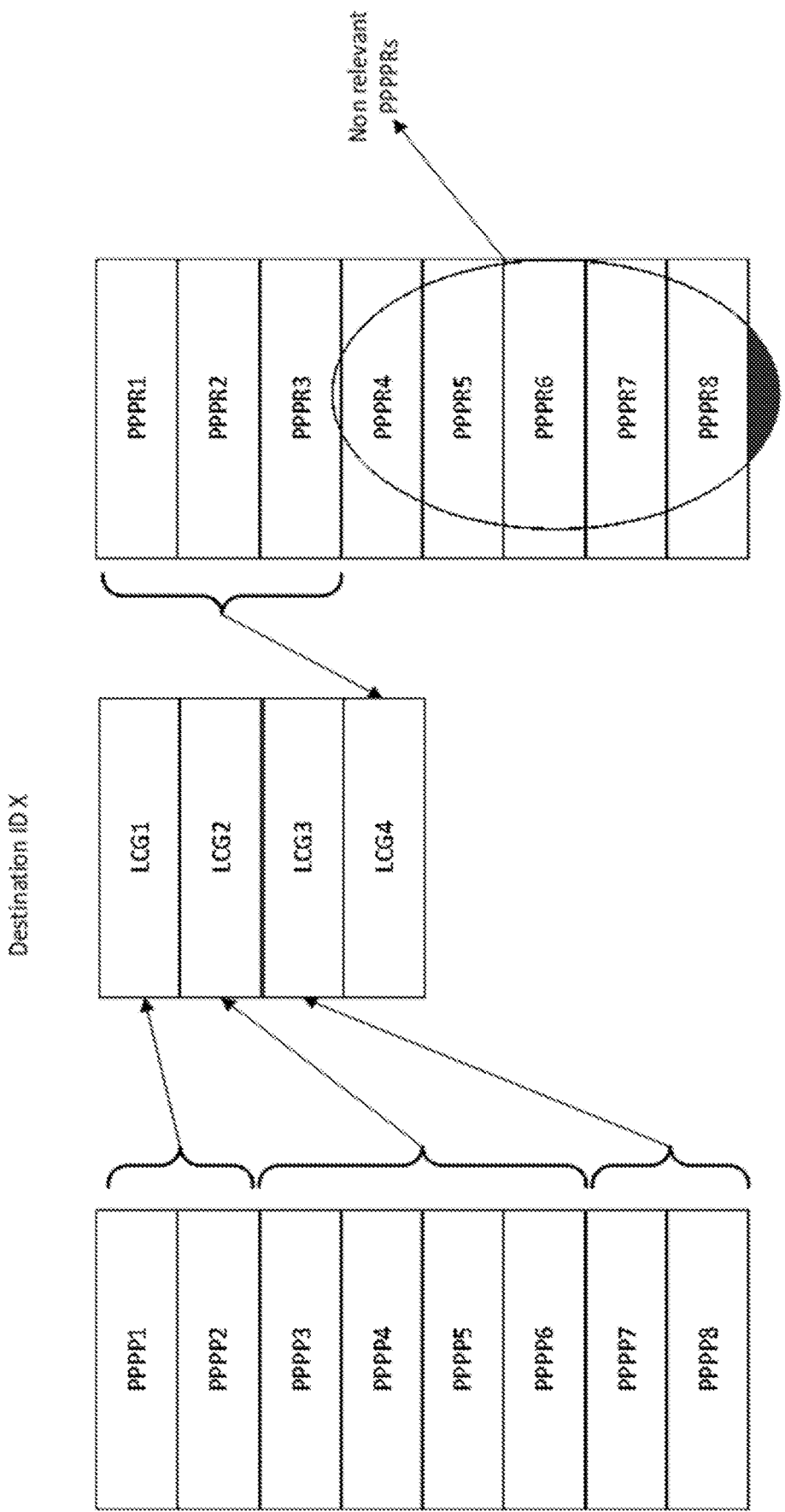
FIG. 3b shows a mapping between QoS and LCGs according to some embodiments herein.

FIG. 3b shows a possible configuration of the mapping between different QoS tags the LCG to be used in the BSR reporting for a certain destination ID X. Certain priority tags such as PPPPs are mapped to reserved logical channel groups such as LCG1,2,3 while other priority tags such as PPPRs (reliability tags) are mapped to one reserved LCG, such as LCG 4. For the specific destination index, e.g. ID X, there are certain PPPR that are not relevant, at least for the purpose of LCG mapping, and hence may not be considered in any buffer status computation by the wireless device 10 of any LCG that is associated to a particular value of PPPR.

Figure 3C:
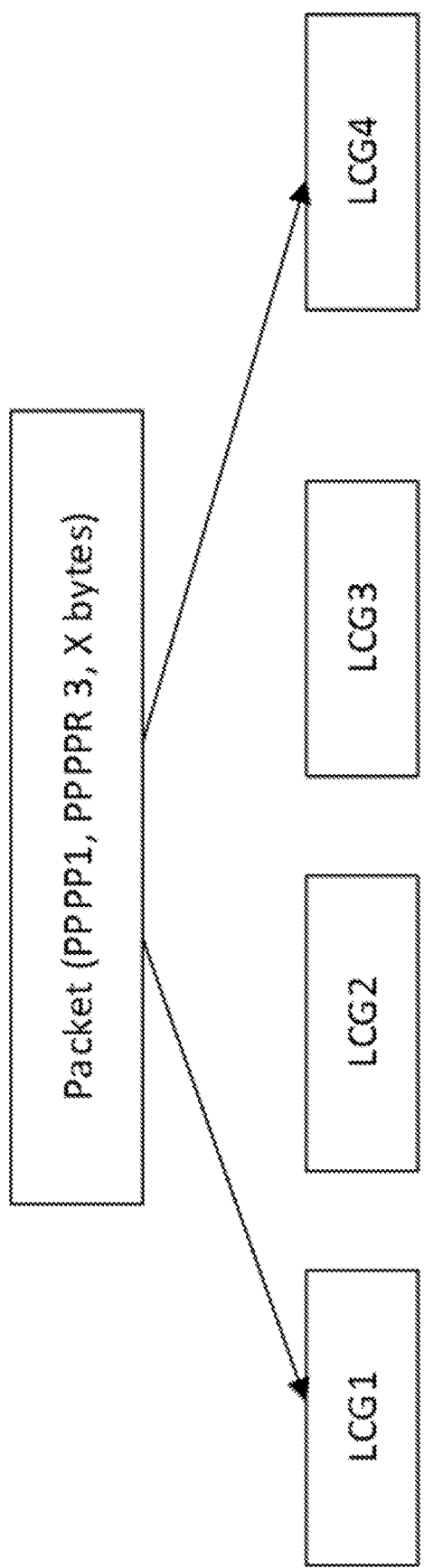
FIG. 3c shows a mapping of different QoS of a packet to LCGs according to some embodiments herein.

In FIG. 3c, the X bytes of a packet may be added to, and/or included in the calculation of, the current buffer size of either LCG1 or LCG4, if for example it is specified that the packet having PPPR/PPPP higher than a certain value should be prioritized of any other QoS tag. In another embodiment, previously described, the X bytes are instead added to the buffer size of both LCG1 and LCG4. As already shown in FIG. 3c, the packet would be only mapped to LCG1, or LCG2, or LCG3 if the PPPR is of lower priority, e.g. PPPR 4 or lower.

In one method each set of LCGs is represented by a group of a certain number of LCGs, and each LCG in the set is identified by a certain ID. LCGs of different sets are mapped to different LCG IDs, e.g. in consecutive order. So that, for example the QoS requirements related to PPPP are mapped to LCG1, LCG2, LCG3, LCG4. The QoS requirements related to reliability are mapped to LCG5, LCG6, LCG7, LCG8. And so on, for the different QoS requirement which are relevant for a given V2X service which is represented by the destination index in the SL BSR MAC. For each destination index, which identifies a V2X service type, it is associated one or more logical channel group associated to the QoS of interest for the destination index. (Pre)configuration may indicate the QoS of interest for each V2X service type, so that the wireless device and/or radio network node will just configure the reporting of the QoS of interest for the specific V2X service type that the wireless device 10 needs to transmit.

Therefore, when receiving an SL BSR, the radio network node 12 may understand the amount of data corresponding to the different QoS characteristic that may be available in the wireless device 10 sidelink buffer for transmission, for a specific destination index.

The mapping between QoS requirement and LCGs or set or group of LCG may be provided by the NW or preconfigured, and different sets of LCGs may contain different number of LCGs.

Figure 4:
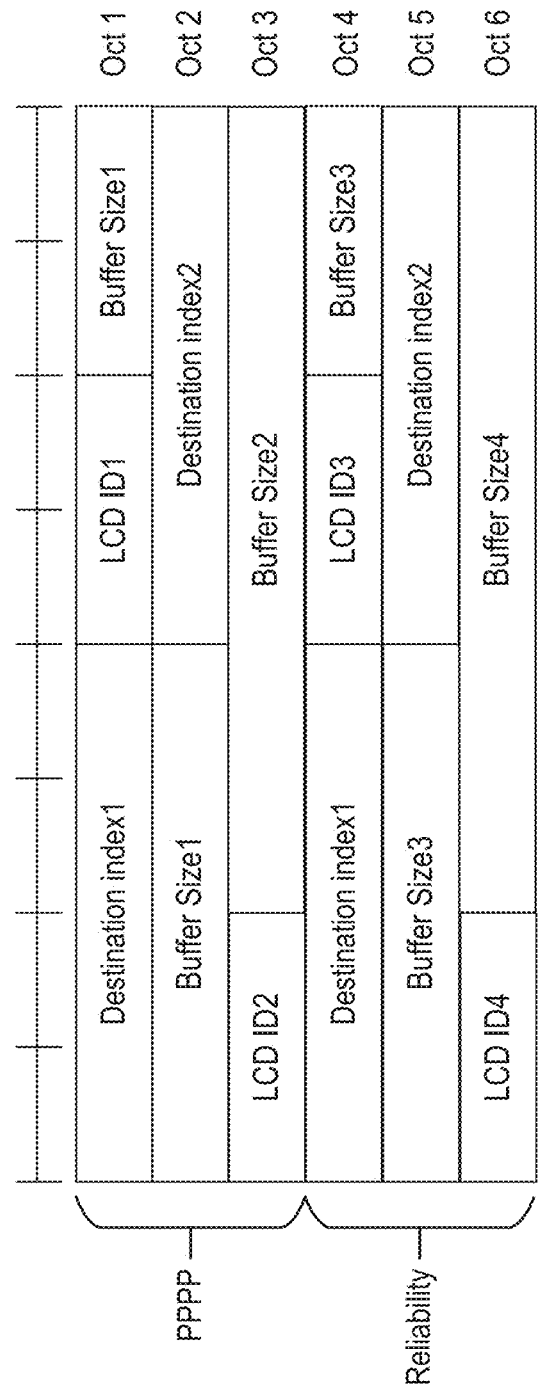
FIG. 4 shows mapping of LCGs to different LCG sets for different QoS characteristics.

Therefore according to this method, the SL BSR may look like in FIG. 4, where different octets corresponding to different LCG IDs are mapped to different groups of QoS characteristics or requirements. In FIG. 4, for simplicity, 4 LCGs are considered, with LCG1-2 mapped to PPPP and LCG3-4 mapped to reliability. Considering N destination indexes, X LCGs and Y QoS characteristics of interest, the SL BSR MAC CE will delivery at most N*X*Y buffer size status to the radio network node 12.

In another method, the LCG IDs are the same across different sets or groups of LCGs for different QoS characteristics or requirements, and unlike previous method, different SL BSR MAC CEs may be used to report the BSR related to different QoS. Each SL BSR MAC CE may carry information related to different QoS, and it is uniquely identified by a dedicate LCID value in the MAC header. Depending on different SL BSR triggering condition, the wireless device 10 may trigger the SL BSR MAC CE associated to a QoS characteristic or to another, thereby appending a specific configured LCID value to represent the specific MAC CE in the MAC subheader.

In another method, the LCG IDs are the same across different sets or groups of LCGs for different QoS characteristics or requirements, and unlike previous method, the same SL BSR MAC CEs is used to report the BSR related to different QoS. This implies that each group or set of LCGs is assigned an ID which exclusively represents the group. It may be the radio network node 12 or the preconfiguration or specification to indicate the group ID associated to each QoS indicator or requirement. Depending on different SL BSR triggering condition, the wireless device 10 may trigger a SL BSR MAC CE associated to a QoS characteristic or to another, thereby appending the specific configured group ID to which the LCGs therein are associated. For example, in the SL BSR MAC CE some specific field, e.g. field 'G', may be used to represent the specific group, i.e. 'G=00' could represent the PPPP-related information, 'G=01' the reliability-related information. How many 'G' bits should be reserved to represent the different groups of QoS, may depend on the amount of QoS requirements that are of interest.

FIG. 5 shows Group reporting in MAC CE.

In another method, one LCG in one LCG set is made up of logical channel identifiers which are allocated for a given QoS requirement of the packet. Wherein the logical channel identities can be different for different set of QoS requirements. For example, on the basis of the PPPP, a given packet may be mapped by the wireless device 10 to the ordinary logical channel ID (LCID) by the MAC entity which in its turn is grouped into a specific LCG set A, and at the same time the same packet may mapped by the MAC entity to another logical channel tag which belongs to another LCG set B. The LCG set A is used by the MAC entity for the logical channel prioritization, while the LCG set B is used to report to radio network node 12 the buffer status of a specific QoS requirement, following one of the aforementioned MAC CE design.

In yet another embodiment, the (pre)configuration maps a certain packet having certain QoS characteristics into a specific LCID depending on the QoS characteristic of interest. For example, if a packet has a very stringent reliability requirement, and relaxed latency requirement, such packet is mapped into a specific set of LCIDs which are dedicated/reserved to packets of stringent reliability requirement. The LCGs in which such set of LCIDs may be mapped may be also reserved.

As an example, it is taken the case of packet duplication, i.e. same packet to be transmitted twice over different carriers. The radio network node 12 may configure packet duplication for all the packets having reliability requirement of certain relevance, said ProSe Per Packet Reliability (PPPR) such as PPPR1 and PPPR2.

One replica of the duplicate packet may be mapped to LCIDs, taking into account one QoS characteristic, e.g. the PPPP, while the other replica of the duplicate packet may be mapped to LCIDs, taking into account the reliability characteristics, e.g. PPPR1/2. The MAC entity may be configured such that one of the duplicate with PPPR1 is mapped to one of the available LCID on the basis of the PPPP, while the other duplicate is mapped to another reserved LCID on the basis of the PPPR, which is PPPR1 in this case. Similarly, if there is another packet with PPPR2 to be transmitted, such packet may be mapped to a certain LCID on the basis of the associated PPPP, and to another reserved LCID on the basis of the associated PPPR, which is PPPR2 in this case. Such latter LCID may or may not be the same as the LCID associated to the previous packet having PPPR1. The set of LCIDs dedicated to the relevant PPPR, in this case PPPR1 and PPPR2, may be grouped into a specific LCG ID which can be exclusively dedicated to the LCIDs having relevant PPPR. The wireless device 10 may not allocate LCIDs of packets with non-relevant QoS requirement to the LCG ID which is reserved to the LCIDs of packets with relavant QoS requirement, i.e. PPPR1 and PPPR2 in this case. In one embodiment, the wireless device 10 may indicate to the network, e.g. via RRC signalling the LCIDs which are reserved for packets having certain QoS characteristics.

In this case, the MAC CE design may look like the one in FIG. 4, in which one or more specific LCGs associated by the radio network node 12 to a certain LCG group is identified by the radio network node 12 as delivering information about buffer status of packets which require a specific QoS. For example, in FIG. 4, the group of LCG3 and LCG4 are identified by the radio network node 12 as delivering information associated to the reliability requirement.

Triggering conditions for the SL BSR may be the same as for legacy BSR, e.g. periodic triggering, or new data becoming available for a logical channel of higher priorities than any other logical channel with data already available in the buffer.

If the same packet is mapped to one or more different logical channel group sets corresponding to different QoS, it may or may not trigger the SL BSR depending on the priority of such packet in the different associated logical channel groups sets to which it has been mapped. For example, if in at least one of the LCG belonging to one set of LCG in which a packet has been assigned, the packet has highest priority than all the other packets in any LCG belonging to the same set of LCGs, a SL BSR will be triggered.

For example, consider as in FIG. 4, two sets of LCGs, i.e. LCG1 and 2 associated to priority characteristics, and LCG3 and 4 to reliability. If a packet with LCID belonging to LCG1 is received and no other data currently in the buffer, a SL BSR is triggered. If another packet with LCID 2 belonging to LCG2 is received, no SL BSR is triggered since there is already a packet of highest priority in the UE buffer. If another packet with LCID 3 belonging to LCG3 is received, a SL BSR is triggered since the other two packets in the UE buffer have highest LCID priority but they belong to another LCG set.

Figure 6:
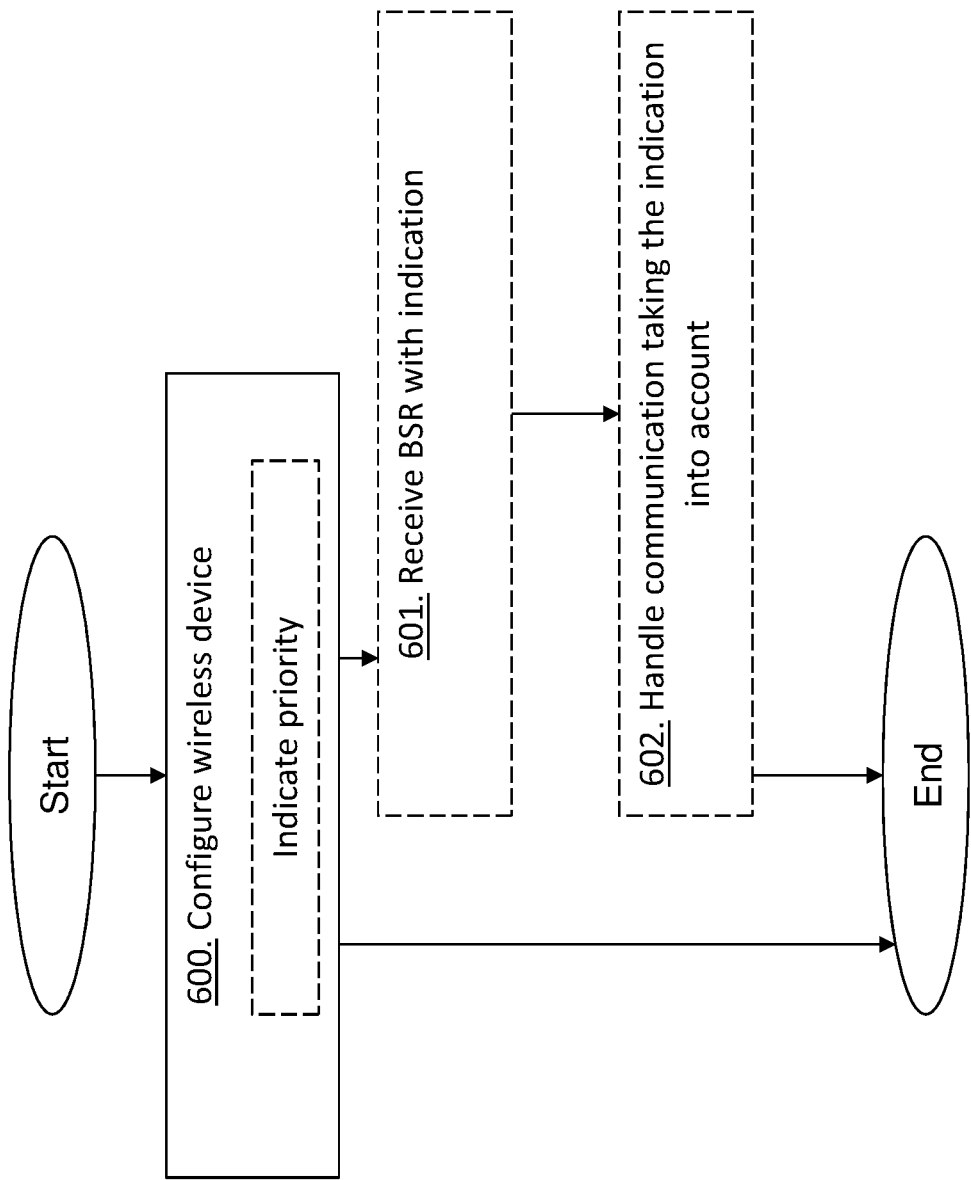
FIG. 6 shows a schematic flowchart depicting a method performed by a radio network node according to embodiments herein.

The method actions performed by the radio network node 12 for handling communication between wireless devices over a sidelink in a wireless communication network according to some embodiments will now be described with reference to a flowchart depicted in FIG. 6. The actions do not have to be taken in the order stated below, but may be taken in any suitable order. Actions performed in some embodiments are marked as dashed boxes.

Action 600. The radio network node 12 configures the wireless device 10 by indicating the set of one or more quality of service (QoS) requirements, wherein each QoS requirement comprises a threshold associated with a QoS characteristic, and by indicating the mapping of one or more LCG reserved for BSR reporting of a sidelink for data fulfilling respective QoS requirement out of the set of one or more QoS requirements. The QoS requirement may be indicating a level associated with a QoS characteristic. The radio network node 12 configures the wireless device 10 by sending sends e.g. two pieces of information: which QoS requirement the wireless device 10 shall consider when doing the mapping, and what level of that QoS requirement shall be mapped. For example; all data having PPPP of 3 and higher is mapped to a certain LCG. Then the radio network node 12 may also send an indication of which LCG the above traffic should be associated with. Hence, by indicating to the wireless device 10 to use a certain LCG for reporting the buffer status of data having a specific QoS characteristics. The set may comprise more than one QoS requirement. Considering that a given packet may have multiple QoS requirements of interest, the radio network node 12 may configure the wireless device 10 to map such packet into multiple LCGs, where each LCG corresponds to one QoS characteristics of such packet. Alternatively or additionally, each QoS requirement may be mapped to a different LCG. The radio network node 12 may indicate to the wireless device that one or more QoS requirements are prioritized over other one or more QoS requirements, e.g. the radio network node 12 may configure the wireless device 10 that a certain QoS is prioritized over other QoSs. The radio network node 12 may configure the wireless device 10 that one specific QoS characteristics is prioritized, when the corresponding QoS value is above a certain threshold, which may be (pre)configured. In one method the threshold may be (pre)configured differently for different SL services, and/or for different destination IDs.

Action 601. The radio network node 12 may receive an indication from the wireless device 10 in the BSR, which indication is an LCG mapped to a fulfilled QoS requirement of a packet e.g. the indication indicates a quality of service (QoS) requirement or characteristic of a packet. The indication being associated with a logical channel.

Action 602. The radio network node 12 may then handle the communication of the sidelink of the wireless device 10 taking the received indication into account. In one embodiment once receiving the BSR with the LCGs corresponding to the different QoS characteristics, the radio network node 12 may perform certain actions relating to the sidelink communication. For example, if the BSR shows that the wireless device 10 has packets having high PPPR, alternatively having an amount of data with a high PPPR exceeding a certain threshold, the radio network node 12 may configure packet duplication for the wireless device 10. The configuration may occur via Radio resource control (RRC) signalling or MAC CE.

For example, the radio network node 12 may explicitly indicate, to the wireless device 10, which packets to duplicate, i.e. based on e.g. the reliability of the packet such as that all the packets having reliability higher than a certain value should be duplicated. If this is done via a MAC CE, the MAC CE may contain a set of bits, e.g. one octet, where each bit represents the PPPR for which packet duplication should be enabled. If the value of the bit is 1 the wireless device does packet duplication for the corresponding PPPR otherwise it does not. Similarly, the radio network node 12 may indicate to the wireless device 10 to stop duplicating if the wireless device 10 has no packets with high reliability, or the number of such packets is lower than a threshold.

In another embodiment, the radio network node 12 does not signal for which QoS such as PPPR the wireless device 10 should start doing duplication. Assuming that the radio network node 12 has previously indicated which are the relevant PPPRs and the related LCG mapping, the radio network node 12 may simply send a flag indicating that packet duplication over the sidelink should be allowed for all the relevant PPPRs for which an LCG mapping has been provided. In case this is done via MAC CE, the MAC CE can be a zero-bit MAC CE.

For example, the radio network node 12 may send e.g. two mappings:

Mapping A: all traffic having priority 3 or higher should be mapped to LCG 1;

Mapping B: all traffic requiring reliability 2 or higher should be mapped to LCG 2;

A packet with priority 2 and reliability 5 would go in to LCG 1 (meets mapping A, but does not meet mapping B).

A packet with priority 4 and reliability 2 would go in to LCG 2 (meets mapping B, but does not meet mapping A).

A packet with priority 2 and reliability 2 may go into both LCG1 and LCG 2. Basically, when the wireless device 10 calculates and reports how much data is available in LCG1 it would include this packet, but it would also include this packet when calculating how much data is available in LCG 2. Alternatively, the packet with priority 2 and reliability 2 may map only to one of LCG1 and LCG2, depending on which QoS characteristic is prioritized, prioritization may be based on radio network node signalling or "preconfiguration".

Figure 7:
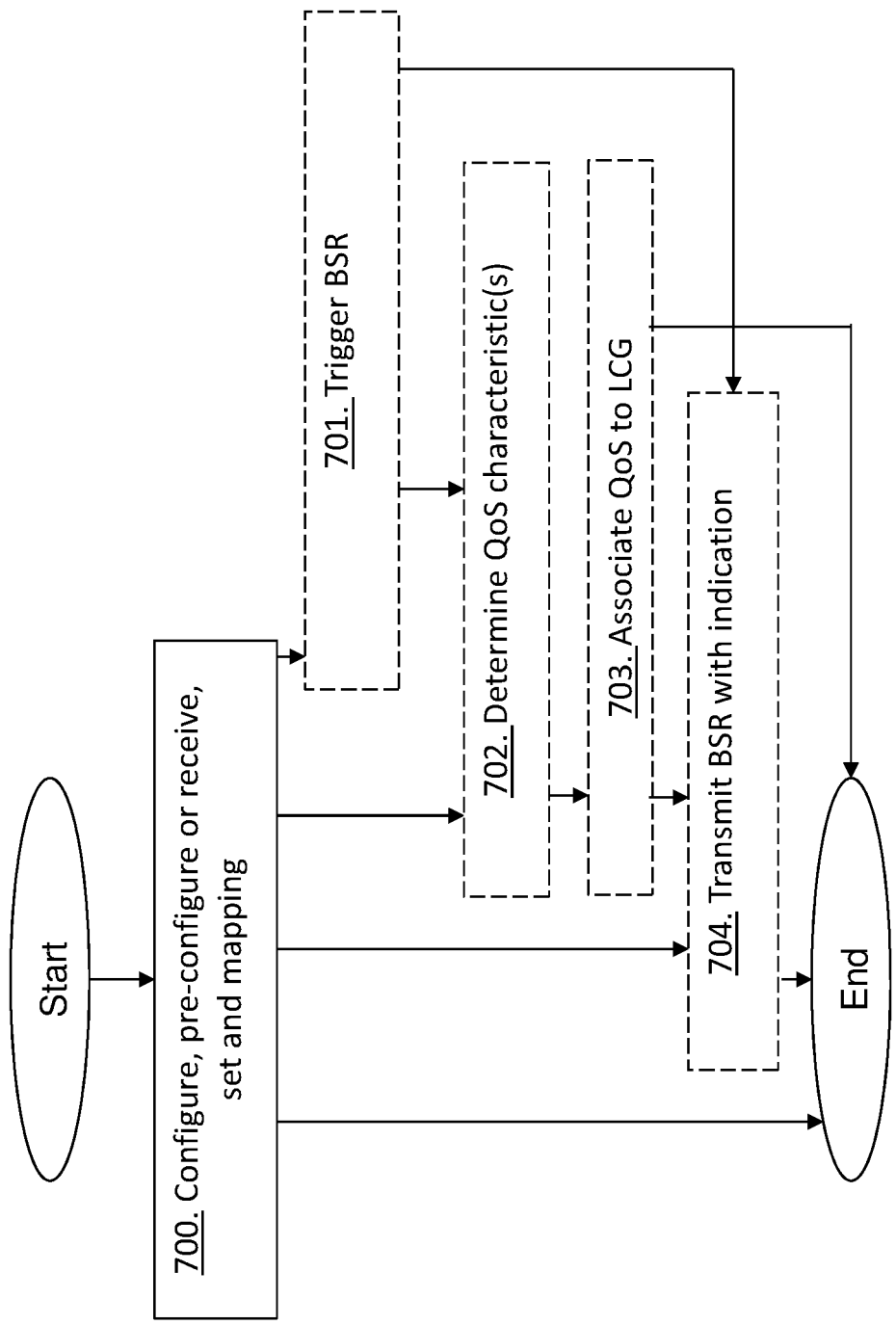
FIG. 7 shows a schematic flowchart depicting a method performed by a wireless device according to embodiments herein.

The method actions performed by the wireless device 10 for handling communication between wireless devices over a sidelink in the wireless communication network according to some embodiments will now be described with reference to a flowchart depicted in FIG. 7. Actions performed in some embodiments are marked with dashed boxes.

Action 700. The wireless device 10 configures, from pre-configuration or reception, the set of one or more QoS requirements, wherein each QoS requirement comprises a threshold or level associated with a QoS characteristic, and a mapping of one or more LCGs reserved for BSR reporting, to the radio network node, of a sidelink for data fulfilling respective QoS requirement out of the set of one or more QoS requirements. The set may comprise more than one QoS requirement. Thus, the wireless device 10 is configured or receives from the radio network node 12 a set of one or more QoS of interest mapped to one or more LCGs for BSR reporting. In another method, all the possible QoS that are specified are of interest. The indication may indicate one or more QoS requirements of the packet in a buffer associated to the buffer status report, wherein the one or more QoS requirements comprise at least one of: reliability, latency, and data rate; and wherein the indication is associated with a logical channel. The wireless device 10 may configure, or be configured, that one or more QoS requirements are prioritized over other one or more QoS requirements.

Action 701. The wireless device 10 may trigger the BSR.

Action 702. The wireless device 10 may determine one or more QoS requirements of a packet in a buffer.

Action 703. The wireless device 10 may then map each one or more QoS requirements to a different LCG as configured.

Action 704. The wireless device 10 may transmit the indication to the radio network node 12 in the buffer status report, which indication is an LCG mapped to a fulfilled QoS requirement of a packet e.g. the indication indicates a QoS requirement or characteristic of a packet and is associated with a logical channel.

Figure 8:
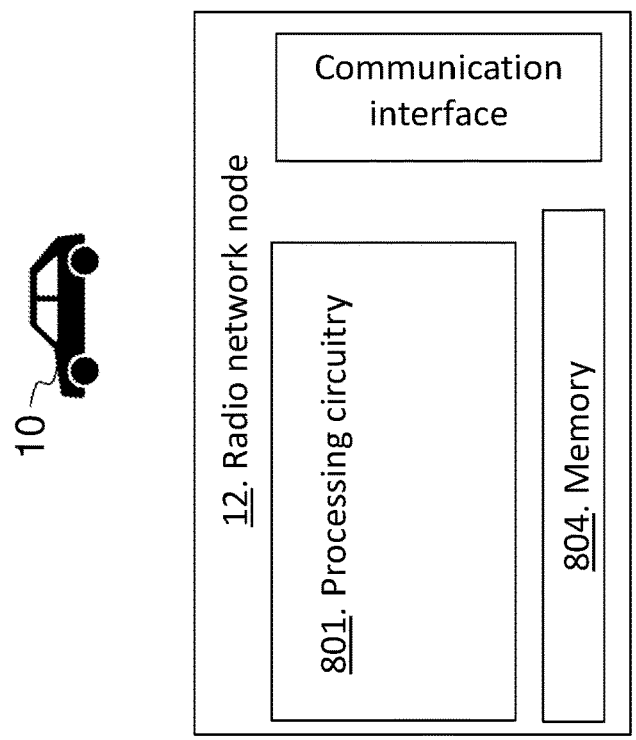
FIG. 8 is a block diagram depicting a radio network node according to embodiments herein.
Figure 8:
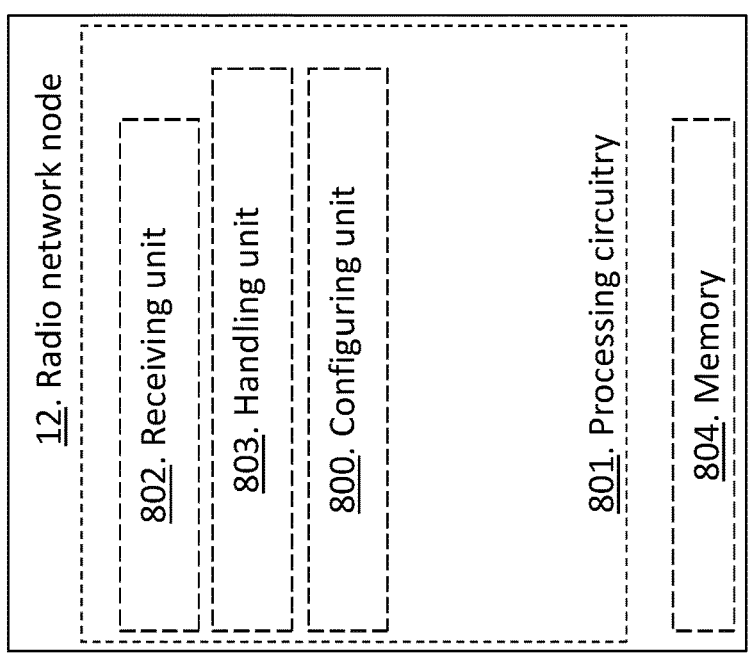
Figure 8:
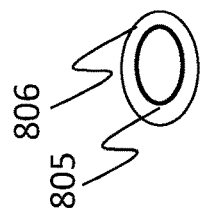

FIG. 8 is a block diagram depicting the radio network node 12, illustrated in to two embodiments, for handling communication between wireless devices over a sidelink in the wireless communication network according to embodiments herein.

The radio network node 12 may comprise processing circuitry 801, e.g. one or more processors, configured to perform the methods herein.

The radio network node 12 may comprise a configuring unit 800. The radio network node 12, the processing circuitry 801, and/or the configuring unit 800 is adapted to configure the radio network node 12 by indicating the set of one or more QoS requirements, wherein each QoS requirement comprises a threshold associated with a QoS characteristic, and by indicating a mapping of one or more LCG reserved for BSR reporting of a sidelink for data fulfilling respective QoS requirement out of the set of one or more QoS requirements. E.g. with a set of one or more QoS mapped to one or more LCGs for BSR reporting. In another method, all the possible QoS that are specified are of interest. The set may comprise more than one QoS requirement. The radio network node 12, the processing circuitry 801, and/or the configuring unit 800 may be configured to indicate to the wireless device 10 that one or more QoS requirements are prioritized over other one or more QoS requirements.

The radio network node 12 may comprise a receiving unit 802, e.g. a receiver module or a transceiver module. The radio network node 12, the processing circuitry 801, and/or the receiving unit 802 may be configured to receive the indication from the wireless device 10 in the BSR, which indication is an LCG mapped to a fulfilled QoS requirement of a packet in the BSR e.g. the indication indicates a quality of service (QoS) requirement or characteristic of a packet and being associated with a logical channel. Each QoS requirement may be mapped to a different LCG. The QoS requirement may be indicating a level associated with a QoS characteristic.

The radio network node 12 may comprise a handling unit 803. The radio network node 12, the processing circuitry 801, and/or the handling unit 803 may be configured to handle the communication of the sidelink of the wireless device 10 taking the received indication into account. The radio network node 12 may further comprise a communication interface comprising e.g. one or more antennas.

The radio network node 12 further comprises a memory 804. The memory comprises one or more units to be used to store data on, such as indications, configuration indications, mapping of LCG, LCID, applications to perform the methods disclosed herein when being executed, and similar.

The methods according to the embodiments described herein for the radio network node 12 are respectively implemented by means of e.g. a computer program product 805 or a computer program, comprising instructions, i.e., software code portions, which, when executed on at least one processor, cause the at least one processor to carry out the actions described herein, as performed by the radio network node 12. The computer program product 805 may be stored on a computer-readable storage medium 806, e.g. a disc, a universal serial bus (USB) stick or similar. The computer-readable storage medium 806, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium.

Figure 9:
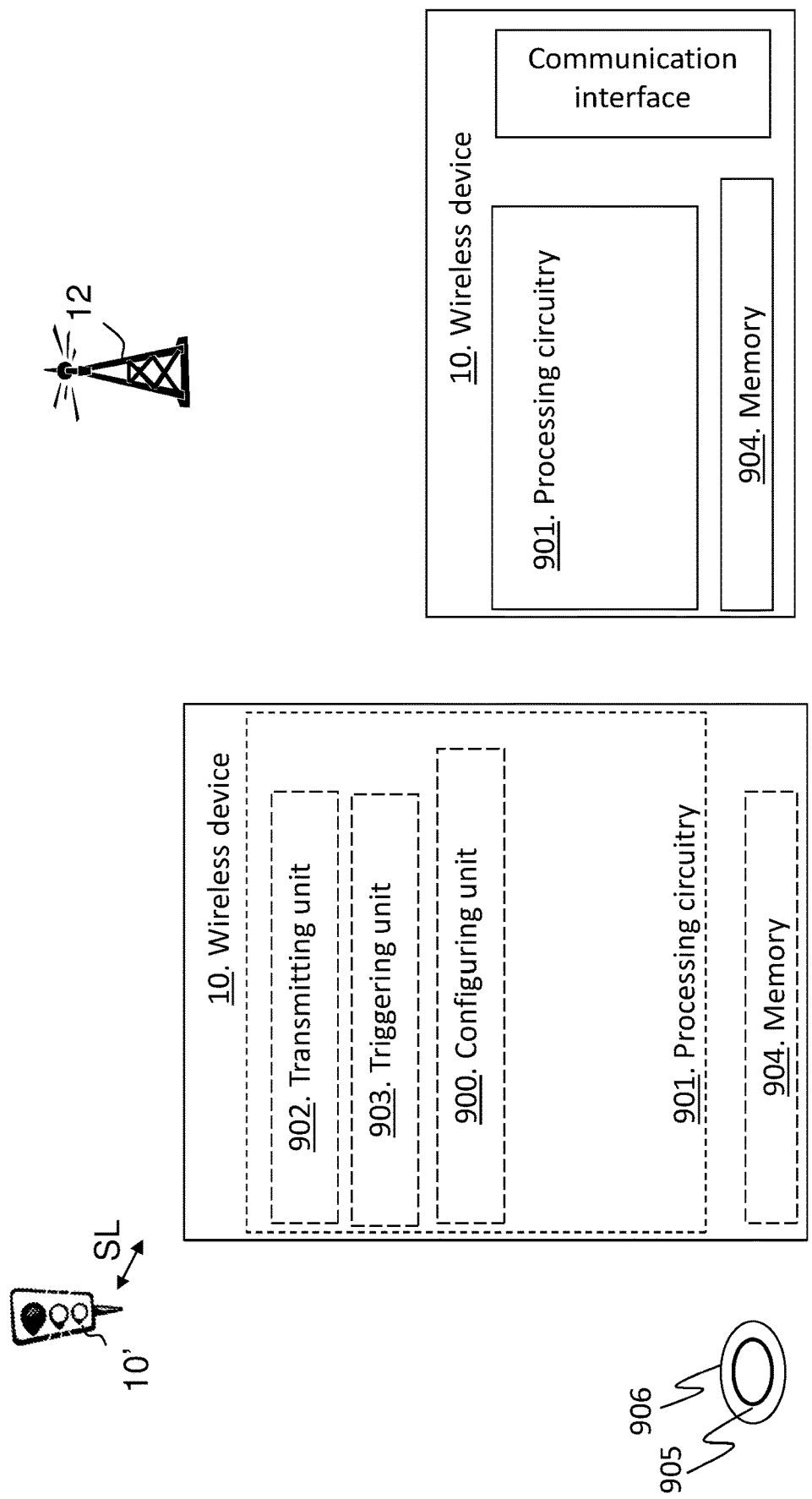
FIG. 9 is a block diagram depicting a wireless device according to embodiments herein.

FIG. 9 is a block diagram depicting the wireless device 10, illustrated in two embodiments, for handling communication between the wireless device and another wireless device over a sidelink, e.g. in vehicle to anything communication, in the wireless communication network according to embodiments herein.

The wireless device 10 may comprise processing circuitry 901, such as one or more processors, configured to perform methods herein.

The wireless device 10 may comprise a configuring unit 900. The wireless device 10, the processing circuitry 901, and/or the configuring unit 900 is adapted to configure or receive, from pre-configuration or reception, the set of one or more QoS requirements, wherein each QoS requirement comprises the threshold associated with the QoS characteristic, and the mapping of one or more LCG reserved for BSR reporting, to the radio network node, of the sidelink for data fulfilling respective QoS requirement out of the set of one or more QoS requirements. The set may comprise more than one QoS requirement. E.g. receive from the radio network node 12, a set of one or more QoS of interest mapped to one or more LCGs for BSR reporting. In another method, all the possible QoS that are specified are of interest. The wireless device 10, the processing circuitry 901, and/or the configuring unit 900 may be adapted to configure that one or more QoS requirements are prioritized over other one or more QoS requirements.

The wireless device 10 may comprise a transmitting unit 902, e.g. a transmitter module or transceiver module. The wireless device 10, the processing circuitry 901, and/or the transmitting unit 902 may be configured to transmit the indication to the radio network node in the BSR, which indication indicates an LCG mapped to a fulfilled QoS requirement of a packet e.g. a quality of service (QoS) requirement or characteristic of a packet and is associated with a logical channel. The indication may indicate one or more QoS requirements of the packet in a buffer associated to the buffer status report, wherein the one or more QoS requirements comprise at least one of: reliability, latency, and data rate; and wherein the indication is associated with a logical channel.

The wireless device 10 may comprise a triggering unit 903. The wireless device 10, the processing circuitry 901, and/or the triggering unit 903 may be configured to trigger the BSR. The wireless device 10, the processing circuitry 901, and/or the triggering unit 903 may be configured to determine one or more QoS requirements of a packet in a buffer; and to map each one or more QoS requirements to a different LCG as configured.

The wireless device 10 further comprises a memory 904. The memory comprises one or more units to be used to store data on, such as indications, configuration indications, mapping information, QoS information, applications to perform the methods disclosed herein when being executed, and similar. The wireless device 10 may further comprise a communication interface comprising e.g. one or more antennas.

The methods according to the embodiments described herein for the wireless device 10 are respectively implemented by means of e.g. a computer program product 905 or a computer program, comprising instructions, i.e., software code portions, which, when executed on at least one processor, cause the at least one processor to carry out the actions described herein, as performed by the wireless device 10. The computer program product 905 may be stored on a computer-readable storage medium 906, e.g. a disc, a USB stick or similar. The computer-readable storage medium 906, having stored thereon the computer program product, may comprise the instructions which, when executed on at least one processor, cause the at least one processor to carry out the actions described herein, as performed by the wireless device 10. In some embodiments, the computer-readable storage medium may be a transitory or a non-transitory computer-readable storage medium.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Embodiment 1. A first embodiment herein may disclose a radio network node comprising processing circuitry and a memory, wherein the processing circuitry is configured to:

configure a wireless device by indicating a set of one or more quality of service, QoS, requirements, wherein each QoS requirement comprises a threshold associated with a QoS characteristic, and by indicating a mapping of one or more logical channel groups, LCG, reserved for buffer status report, BSR, reporting of a sidelink for data fulfilling respective QoS requirement out of the set of one or more QoS requirements.

Embodiment 2. The radio network node according to the first embodiment, wherein the set comprises more than one QoS requirement.

Embodiment 3. The radio network node according to the first embodiment, wherein the processing circuitry is configured to receive an indication from the wireless device in a buffer status report, which indication is an LCG mapped to a fulfilled QoS requirement of a packet; and to handle communication of the sidelink of the wireless device taking the received indication into account.

Embodiment 4. The radio network node according to the first embodiment, wherein the processing circuitry is further configured to indicate to the wireless device that one or more QoS requirements are prioritized over other one or more QoS requirements.

Embodiment 5. The radio network node according to the first embodiment, wherein each QoS requirement is mapped to a different LCG.

Embodiment 6. The radio network node according to the first embodiment, wherein the QoS requirement is indicating a level associated with a QoS characteristic.

Embodiment 7. A second embodiment disclosing a wireless device comprising processing circuitry and a memory, wherein processing circuitry is configured to configure, from pre-configuration or reception, a set of one or more quality of service, QoS, requirements, wherein each QoS requirement comprises a threshold associated with a QoS characteristic, and a mapping of one or more logical channel groups, LCG, reserved for buffer status report, BSR, reporting, to a radio network node, of a sidelink for data fulfilling respective QoS requirement out of the set of one or more QoS requirements.

Embodiment 8. The wireless device according to the second embodiment, wherein the set comprises more than one QoS requirement.

Embodiment 9. The wireless device according to the second embodiment, wherein the processing circuitry is further configured to transmit an indication to the radio network node in a buffer status report, which indication is an LCG mapped to a fulfilled QoS requirement of a packet.

Embodiment 10. The wireless device according to the second embodiment, wherein the indication indicates one or more quality of service, QoS, requirements of the packet in a buffer associated to the buffer status report, wherein the one or more QoS requirements comprise at least one of: reliability, latency, and data rate; and wherein the indication is associated with a logical channel.

Embodiment 11. The wireless device according to the second embodiment, wherein the processing circuitry is further configured to:

determine one or more QoS requirements of a packet in a buffer; and map each one or more QoS requirements to a different LCG as configured.

Embodiment 12. The wireless device according to the second embodiment, wherein the processing circuitry is further configured to configure that one or more QoS requirements are prioritized over other one or more QoS requirements.

Embodiment 13. A third embodiment herein may disclose a radio network node comprising configuring unit, wherein the configuring unit is configured to:

configure a wireless device by indicating a set of one or more quality of service, QoS, requirements, wherein each QoS requirement comprises a threshold associated with a QoS characteristic, and by indicating a mapping of one or more logical channel groups, LCG, reserved for buffer status report, BSR, reporting of a sidelink for data fulfilling respective QoS requirement out of the set of one or more QoS requirements.

Embodiment 14. The radio network node according to the third embodiment, wherein the set comprises more than one QoS requirement.

Embodiment 15. The radio network node according to the third embodiment, comprising a receiving unit configured to receive an indication from the wireless device in a buffer status report, which indication is an LCG mapped to a fulfilled QoS requirement of a packet; and a handling unit configured to handle communication of the sidelink of the wireless device taking the received indication into account.

Embodiment 16. The radio network node according to the third embodiment, wherein the configuring unit is further configured to indicate to the wireless device that one or more QoS requirements are prioritized over other one or more QoS requirements.

Embodiment 17. The radio network node according to the third embodiment, wherein each QoS requirement is mapped to a different LCG.

Embodiment 18. The radio network node according to the third embodiment, wherein the QoS requirement is indicating a level associated with a QoS characteristic.

Embodiment 19. A fourth embodiment disclosing a wireless device comprising a configuring unit, wherein the configuring unit is configured to configure, from pre-configuration or reception, a set of one or more quality of service, QoS, requirements, wherein each QoS requirement comprises a threshold associated with a QoS characteristic, and a mapping of one or more logical channel groups, LCG, reserved for buffer status report, BSR, reporting, to a radio network node, of a sidelink for data fulfilling respective QoS requirement out of the set of one or more QoS requirements.

Embodiment 20. The wireless device according to the fourth embodiment, wherein the set comprises more than one QoS requirement.

Embodiment 21. The wireless device according to the fourth embodiment, comprising a transmitting unit configured to transmit an indication to the radio network node in a buffer status report, which indication is an LCG mapped to a fulfilled QoS requirement of a packet.

Embodiment 22. The wireless device according to the fourth embodiment, wherein the indication indicates one or more quality of service, QoS, requirements of the packet in a buffer associated to the buffer status report, wherein the one or more QoS requirements comprise at least one of: reliability, latency, and data rate; and wherein the indication is associated with a logical channel.

Embodiment 23. The wireless device according to the fourth embodiment, wherein the configuring unit is further configured to:
  determine one or more QoS requirements of a packet in a buffer; and
  map each one or more QoS requirements to a different LCG as configured.

Embodiment 24. The wireless device according to the fourth embodiment, wherein the configuring unit is further configured to configure that one or more QoS requirements are prioritized over other one or more QoS requirements.

With reference to FIG. 8A, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8A as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8B. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8B) served by the base station 3320. The communication interface 3326 may be configured to facilitate a connection 3360 to the host computer 3310. The connection 3360 may be direct or it may pass through a core network (not shown in FIG. 8B) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 8B may be identical to the host computer 3230, one of the base stations 3212a, 3212b, 3212c and one of the UEs 3291, 3292 of FIG. 8A, respectively. This is to say, the inner workings of these entities may be as shown in FIG. 8B and independently, the surrounding network topology may be that of FIG. 8A.

In FIG. 8B, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the latency a plurality of QoS may be taken into account during communication and thereby provide benefits such as reduced waiting time and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 9 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 10:
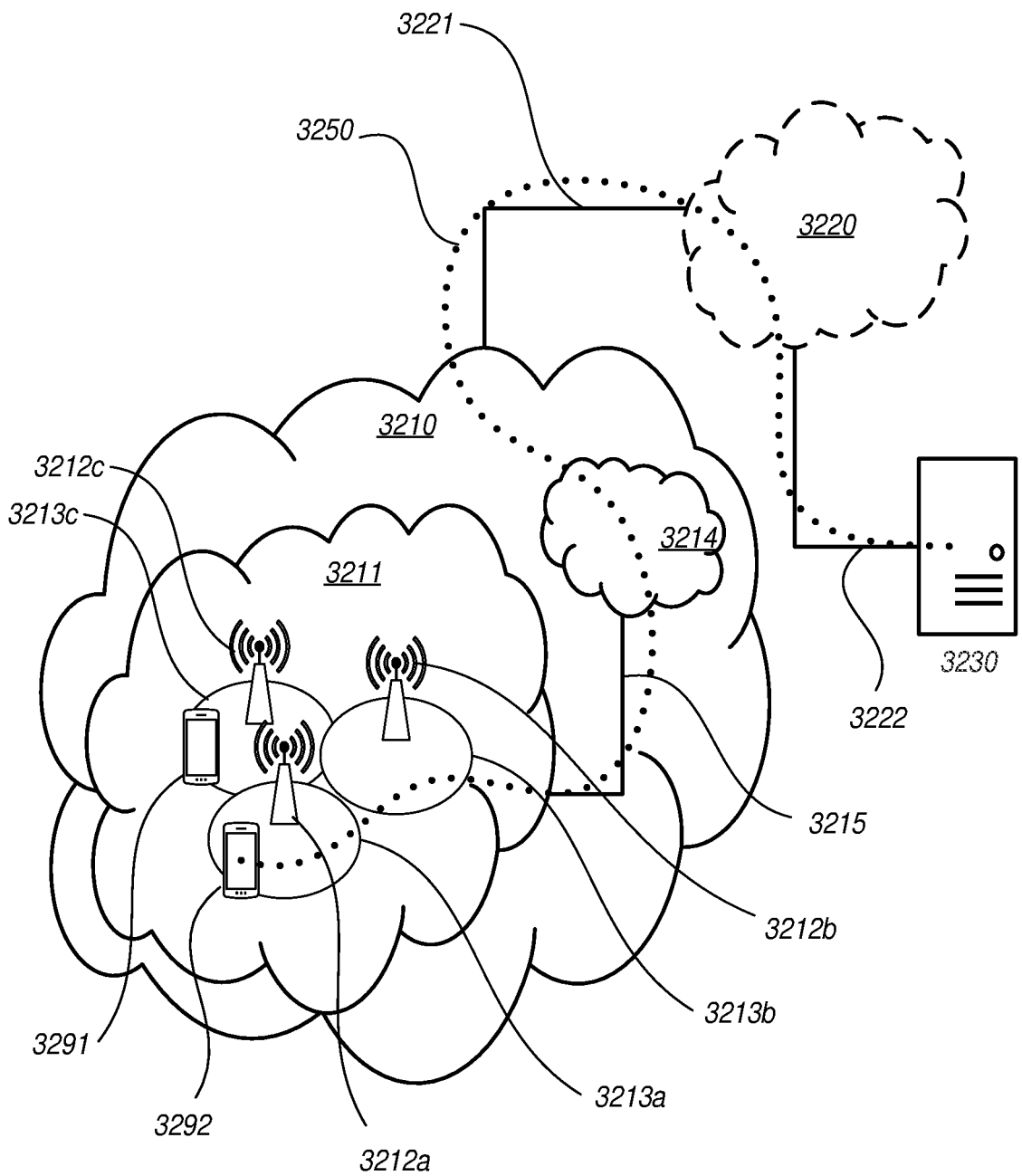
FIG. 10 shows a telecommunication network connected via an intermediate network to a host computer in accordance with some embodiments.

FIG. 10 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 11:
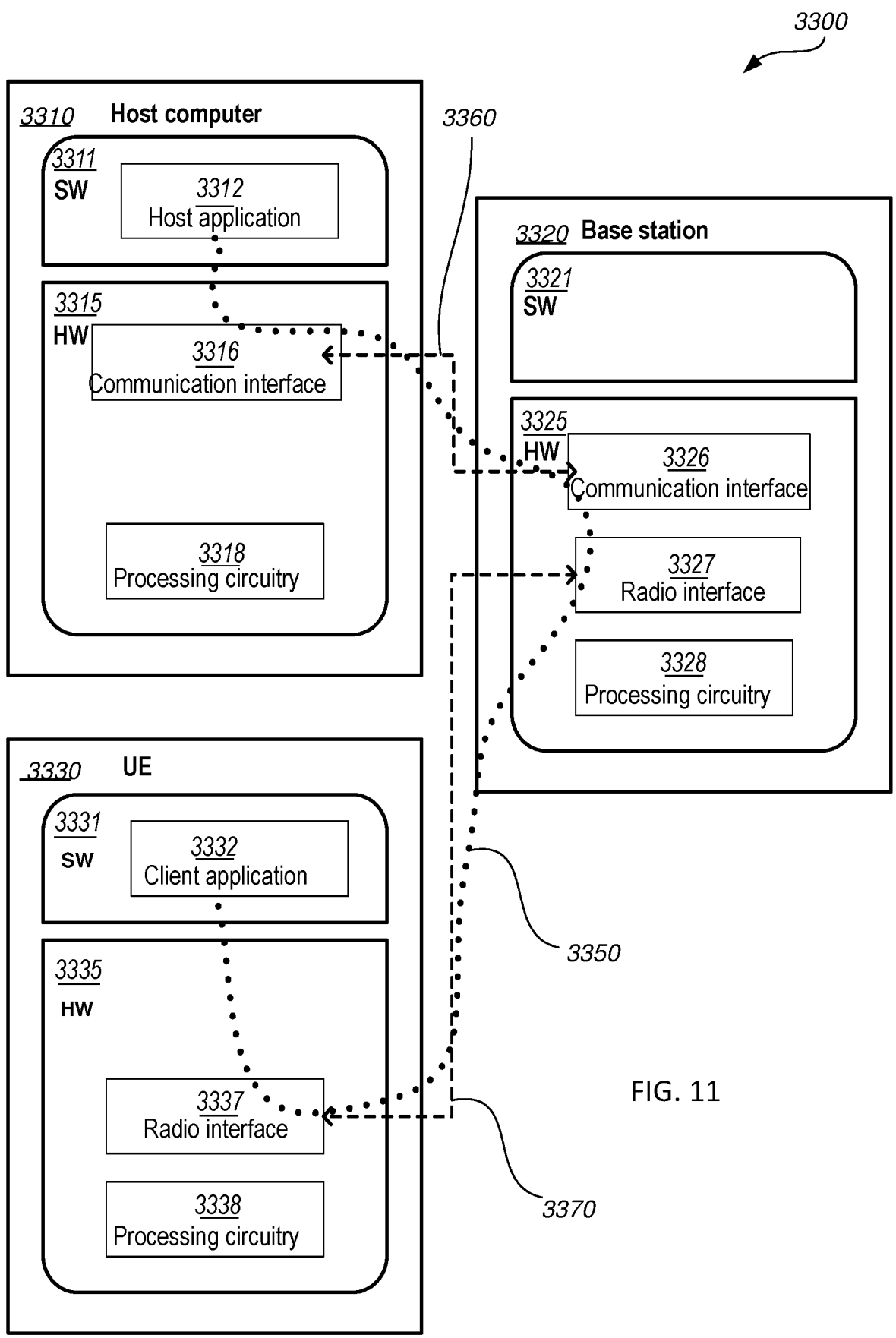
FIG. 11 shows a host computer communicating via a base station with a user equipment over a partially wireless connection in accordance with some embodiments.
Figures 14, 15:
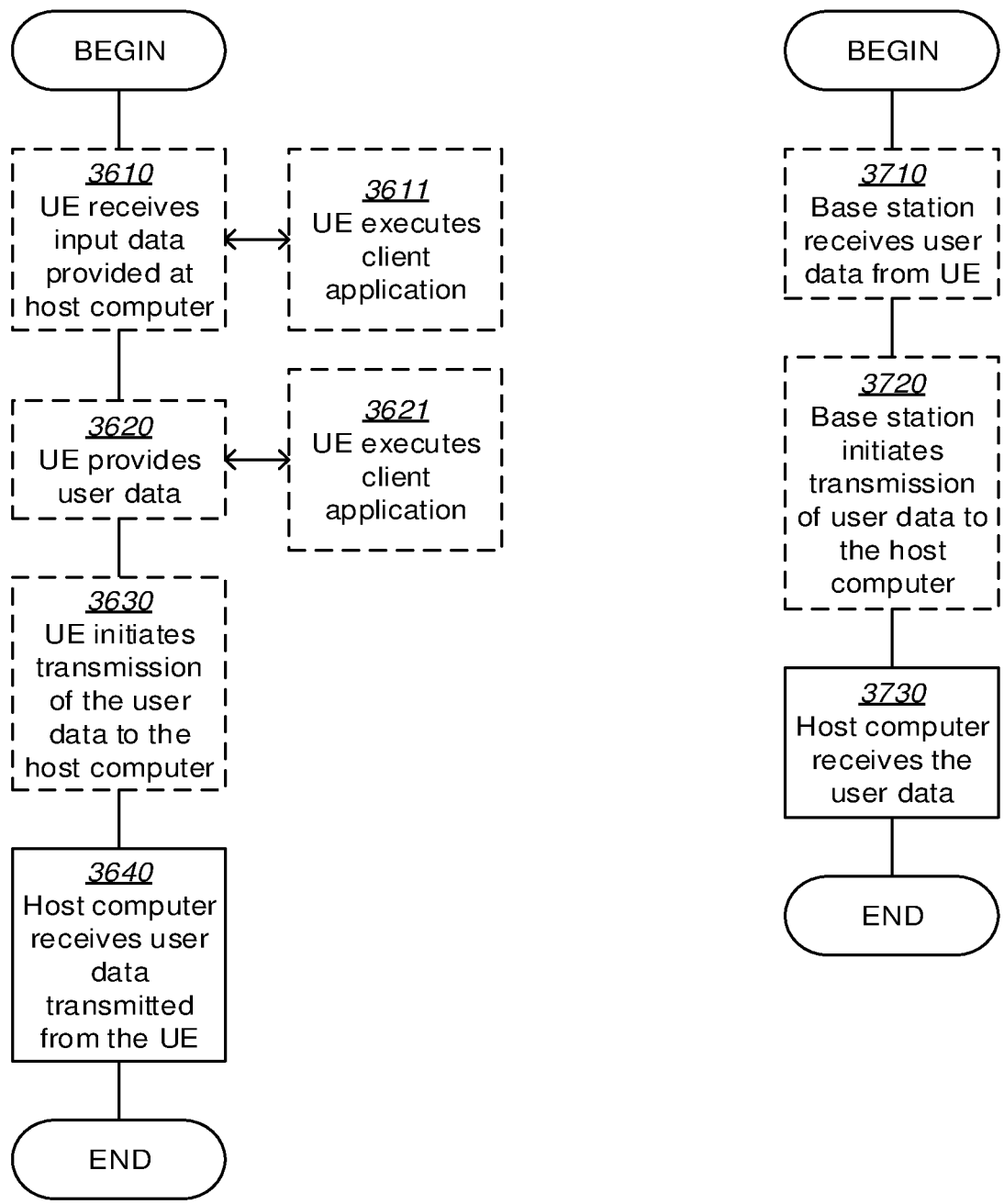
FIG. 14 shows methods implemented in a communication system including a host computer, a base station and a user equipment in accordance with some embodiments.
FIG. 15 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Abbreviation Explanation

3G Third Generation of Mobile Telecommunications Technology
BSM Basic Safety Message
BW Bandwidth
BSR Buffer Status Report
CAM Cooperative Awareness Message
CBR Channel Busy Ratio
DPTF Data Packet Transmission Format
D2D Device-to-Device Communication
DENM Decentralized Environmental Notification Message
DSRC Dedicated Short-Range Communications
eNB eNodeB
ETSI European Telecommunications Standards Institute
LTE Long-Term Evolution
NW Network
RS Reference Signals
TF Transport Format
SAE Society of the Automotive Engineers
UE User Equipment
V2I Vehicle-to-Infrastructure
V2P Vehicle-to-Pedestrian
V2V Vehicle-to-(vehicle) communication
V2x Vehicle-to-anything-you-can-imagine
wrt with respect to
SPS Semi Persistent Scheduling
DMRS Demodulation reference signals
OCC Orthogonal cover code
PDCCH Physical Downlink Control Channel
DBS Delay-Based Scheduler
MAC Medium Access Control
MAC CE MAC Control Element
PUSCH Physical Uplink Shared Channel
PUCCH Physical Uplink Control Channel
PDU Packet Data Unit
3GPP Third Generation Partnership Project
LCID Logical Channel Identity
MAC Medium Access Control
MAC CE Medium Access Control-Control Element
RRC Radio Resource Control
IP Internet Protocol
PPPP ProSe Per Packet Priority
PPPR ProSe Per Packet Reliability
ProSe Proximity Services
PRB Physical Resource Block
SL Sidelink
SPS Semi-Persistent Scheduling
UL Uplink
DL Downlink
LCG Logical Channel Group
SFN System Frame Number
III Transmission Time Interval
SCI Sidenlink Control Information
CA Carrier Aggregation
SLRB Sidelink Radio Bearer
UICC Universal Integrated Circuit Card
ME Mobile Equipment
ID Identifier
PDB Packet Delay Budget
CBR Congestion Busy Ratio
SDU Service Data Unit
PDU Protocol Data Unit
BLER Block Error Rate

The invention claimed is:

1. A method performed by a radio network node configured to handle sidelink communication between wireless devices in a wireless communication network, the method comprising:
   sending, to a wireless device, a configuration indicating:
      a plurality of quality of service (QoS) requirements, including at least one QoS requirement of a first type and at least one QoS requirement of a second type different than the first type; and
      a mapping between the plurality of QoS requirements and a plurality of logical channel groups (LCGs) arranged for sidelink communication of data packets fulfilling the QoS requirements, wherein the mapping includes:
         a first mapping between the at least one QoS requirement of the first type and a first portion of the LCGs, and
         a second mapping between the at least one QoS requirement of the second type and a second portion of the LCGs, wherein the second portion is non-overlapping with the first portion.

2. The method according to claim 1, wherein:
   the QoS requirements of the first type are respective packet priority levels (PPPP), and
   the QoS requirements of the second type are respective packet reliability levels (PPPR).

3. The method according to claim 1, further comprising:
   receive, from the wireless device, a sidelink buffer status report (BSR) that indicates a particular one of the LCGs in which the wireless device has one or more data packets available;

based on the mapping, determining a QoS requirement associated with the data packets available in the particular LCG; and handling sidelink communication of the wireless device according to the determined QoS requirement.

4. The method of claim 3, wherein:
the determined QoS requirement is a high packet reliability level (PPPR); and
handling sidelink communication according to the determined QoS requirement comprises sending, to the wireless device, an indication to perform packet duplication for sidelink transmission of the available data packets.

5. The method according to claim 1, further comprising sending, to the wireless device, a prioritization indication that one of the first and second types of QoS requirements is prioritized over the other of the first and second types, with respect to selecting an LCG for a sidelink BSR for a data packet having both a QoS requirement of the first type and a QoS requirement of the second type.

6. A method performed by a wireless device configured for sidelink communication with other wireless devices in a wireless communication network, the method comprising:
receiving, from a radio network node in the wireless communication network, a configuration indicating:
a plurality of quality of service (QoS) requirements, including at least one QoS requirement of a first type and at least one QoS requirement of a second type different than the first type; and
a mapping between the plurality of QoS requirements and a plurality of logical channel groups (LCGs) arranged for sidelink communication of data packets fulfilling the QoS requirements, wherein the mapping includes:
a first mapping between the at least one QoS requirement of the first type and a first portion of the LCGs, and
a second mapping between the at least one QoS requirement of the second type and a second portion of the LCGs, wherein the second portion is non-overlapping with the first portion; and
transmitting a sidelink BSR to the radio network node in accordance with the configuration.

7. The method of claim 6, wherein:
the QoS requirements of the first type are respective packet priority levels (PPPP), and
the QoS requirements of the second type are respective packet reliability levels (PPPR).

8. The method of claim 6, wherein
the method further comprises, based on the mapping, determining an LCG associated with a QoS requirement of data packets available for sidelink transmission by the wireless device; and
the sidelink BSR indicates the determined LCG.

9. The method of claim 8, wherein:
the QoS requirement is a high packet reliability level (PPPR); and
the method further comprising receiving, from the radio network node in response to the BSR, an indication to perform packet duplication for sidelink transmission of the available data packets.

10. The method of claim 6, wherein:
the method further comprises receiving, from the radio network node, a prioritization indication that one of the first and second types of QoS requirements is prioritized over the other of the first and second types, with respect to selecting an LCG for a sidelink BSR for a data packet having both a QoS requirement of the first type and a QoS requirement of the second type; and
transmitting the sidelink BSR is further based on the prioritization indication.

11. A radio network node configured to handle sidelink communication between wireless devices in a wireless communication network, the radio network node comprising:
a communication interface; and
processing circuitry operably coupled to the communication interface, whereby the processing circuitry and the communication interface are configured to:
send, to a wireless device, a configuration indicating:
a plurality of quality of service (QoS) requirements, including at least one QoS requirement of a first type and at least one QoS requirement of a second type different than the first type;
a mapping between the plurality of QoS requirements and a plurality of logical channel groups (LCGs) arranged for sidelink communication of data packets fulfilling the QoS requirements, wherein the mapping includes:
a first mapping between the at least one QoS requirement of the first type and a first portion of the LCGs, and
a second mapping between the at least one QoS requirement of the second type and a second portion of the LCGs, wherein the second portion is non-overlapping with the first portion.

12. The radio network node of claim 11, wherein:
the QoS requirements of the first type are respective packet priority levels (PPPP), and
the QoS requirements of the second type are respective packet reliability levels (PPPR).

13. The radio network node of claim 11, wherein the processing circuitry and the communication interface are further configured to:
receive, from the wireless device, a sidelink buffer status report (BSR) that indicates a particular one of the LCGs in which the wireless device has one or more data packets available;
based on the mapping, determine a QoS requirement associated with the data packets available in the particular LCG; and
handle sidelink communication of the wireless device according to the determined QoS requirement.

14. The radio network node of claim 13, wherein:
the determined QoS requirement is a high packet reliability level (PPPR); and
the processing circuitry and the communication interface are configured to handle sidelink communication according to the determined QoS requirement based on sending, to the wireless device, an indication to perform packet duplication for sidelink transmission of the available data packets.

15. The radio network node of claim 11, wherein the processing circuitry and the communication interface are further configured to send, to the wireless device, a prioritization indication that one of the first and second types of QoS requirements is prioritized over the other of the first and second types, with respect to selecting an LCG for a sidelink BSR for a data packet having both a QoS requirement of the first type and a QoS requirement of the second type.

16. A wireless device configured for sidelink communication with other wireless devices in a wireless communication network, the wireless device comprising:
a communication interface; and processing circuitry operably coupled to the communication interface, whereby the processing circuitry and the communication interface are configured to:
   receive, from a radio network node in the wireless communication network, a configuration indicating:
      a plurality of quality of service (QoS) requirements, including at least one QoS requirement of a first type and at least one QoS requirement of a second type different than the first type; and
      a mapping between the plurality of QoS requirements and a plurality of logical channel groups (LCGs) arranged for sidelink communication of data packets fulfilling the QoS requirements, wherein the mapping includes:
         a first mapping between the at least one QoS requirement of the first type and a first portion of the LCGs, and
         a second mapping between the at least one QoS requirement of the second type and a second portion of the LCGs, wherein the second portion is non-overlapping with the first portion; and
   transmit a sidelink BSR to the radio network node in accordance with the configuration.

17. The wireless device of claim 16, wherein:
the QoS requirements of the first type are respective packet priority levels (PPPP), and
the QoS requirements of the second type are respective packet reliability levels (PPPR).

18. The wireless device of claim 16, wherein
the processing circuitry and the communication interface are further configured to, based on the mapping, determine an LCG associated with a QoS requirement of data packets available for sidelink transmission by the wireless device; and
the sidelink BSR indicates the determined LCG.

19. The wireless device of claim 18, wherein:
the QoS requirement is a high packet reliability level (PPPR); and
the processing circuitry and the communication interface are further configured to receive, from the radio network node in response to the BSR, an indication to perform packet duplication for sidelink transmission of the available data packets.

20. The wireless device of claim 16, wherein:
the processing circuitry and the communication interface are further configured to receive, from the radio network node, a prioritization indication that one of the first and second types of QoS requirements is prioritized over the other of the first and second types, with respect to selecting an LCG for a sidelink BSR for a data packet having both a QoS requirement of the first type and a QoS requirement of the second type; and
the processing circuitry and the communication interface are configured to transmit the sidelink BSR further based on the prioritization indication.

* * * * *